United States Patent
Yamaoka et al.

(10) Patent No.: US 7,270,855 B2
(45) Date of Patent: Sep. 18, 2007

(54) OPTICAL FILM, METHOD FOR MANUFACTURING THE SAME, AND PHASE DIFFERENCE FILM AND POLARIZING PLATE USING THE SAME

(75) Inventors: Takashi Yamaoka, Ibaraki (JP); Shuuji Yano, Ibaraki (JP); Junichi Adachi, Ibaraki (JP); Masayuki Kawai, Ibaraki (JP); Kanako Wasai, Ibaraki (JP); Nao Murakami, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 382 days.

(21) Appl. No.: 10/499,963

(22) PCT Filed: Jan. 22, 2003

(86) PCT No.: PCT/JP03/00507

§ 371 (c)(1),
(2), (4) Date: Jun. 24, 2004

(87) PCT Pub. No.: WO03/062873

PCT Pub. Date: Jul. 31, 2003

(65) Prior Publication Data

US 2005/0074564 A1    Apr. 7, 2005

(30) Foreign Application Priority Data

Jan. 23, 2002  (JP) .............................. 2002-014528

(51) Int. Cl.
   *G02B 5/30*      (2006.01)
   *C09K 19/42*     (2006.01)
   *C09K 19/36*     (2006.01)
   *G02F 1/13363*   (2006.01)

(52) U.S. Cl. .................. 428/1.1; 428/1.2; 428/1.31; 428/1.5; 428/1.6; 349/117; 252/299.7; 252/299.01

(58) Field of Classification Search ............... 428/1.1, 428/1.2, 1.31, 1.5, 1.6; 349/117; 252/299.01, 252/299.7

See application file for complete search history.

(56) References Cited

U.S. PATENT DOCUMENTS

| | | | |
|---|---|---|---|
| 5,193,020 A | | 3/1993 | Shiozaki et al. ............... 359/73 |
| 5,243,451 A | | 9/1993 | Kanemoto et al. ............. 359/53 |
| 5,486,884 A | * | 1/1996 | De Vaan ..................... 353/122 |
| 5,573,324 A | * | 11/1996 | De Vaan ...................... 353/77 |
| 5,721,603 A | * | 2/1998 | De Vaan et al. ............. 349/194 |
| 5,863,457 A | * | 1/1999 | Hasebe et al. .......... 252/299.01 |
| 5,883,685 A | * | 3/1999 | Mazaki et al. ............... 349/117 |
| 5,896,232 A | * | 4/1999 | Budd et al. .................. 359/630 |
| 5,942,030 A | * | 8/1999 | Schuhmacher et al. ...... 106/493 |
| 6,051,289 A | | 4/2000 | Tsujimoto et al. |
| 6,060,183 A | * | 5/2000 | Higashi et al. .............. 428/701 |
| 2002/0110651 A1 | * | 8/2002 | Suzushi ....................... 428/1.5 |
| 2004/0056991 A1 | * | 3/2004 | Kashima ....................... 349/89 |
| 2004/0130670 A1 | * | 7/2004 | Kashima ..................... 349/122 |

FOREIGN PATENT DOCUMENTS

| | | |
|---|---|---|
| DE | 43 42 280 | 6/1995 |
| DE | 195 20 660 | 12/1996 |
| DE | 195 20 704 | 12/1996 |
| EP | 1 160 591 | 12/2001 |
| JP | 3-67219 | 3/1991 |
| JP | 6-242434 A | 9/1994 |
| JP | 7-120620 A | 5/1995 |
| JP | 2660601 | 6/1997 |
| JP | 2000-85057 A | 3/2000 |
| JP | 2001-343529 | 12/2001 |
| JP | 2001-350021 A | 12/2001 |
| WO | WO 00/39631 | 7/2000 |

OTHER PUBLICATIONS

Translation of International Preliminary Examination Report in the PCT/JP03/00507.
Kaoru Kimura et al.,*High-performance Adhesive and Pressure-sensitive Adhesive*, Kyoritsu Publication Co., Feb. 20, 1989.
Office Action of Corresponding Japanese Patent Application No. 2003-010101.

* cited by examiner

*Primary Examiner*—Shean C Wu
(74) *Attorney, Agent, or Firm*—Westerman, Hattori, Daniels & Adrian LLP

(57) ABSTRACT

A method for preparing an optical film, which comprises applying and developing an application liquid mixture containing a liquid crystal monomer, a chiral agent and a polymerization initiator on an orientation substrate, subjecting the resultant developed layer to a heat treatment, to orient the monomer to a cholesteric structure, and then subjecting the developed layer to a poltmerization treatment, to polymerize the oriented liquid crystal monomer, thereby forming an optical film exhibiting a selective reflection wave length of 100 to 320 nm. An optical film prepared by the above method is reduced in the coloring due to selective reflection.

9 Claims, 2 Drawing Sheets

OPTICAL FILM, METHOD FOR MANUFACTURING THE SAME, AND PHASE DIFFERENCE FILM AND POLARIZING PLATE USING THE SAME

TECHNICAL FIELD

The present invention relates to an optical film, a method for manufacturing the same, a retardation film and a polarizing plate using the same, and an image display apparatus using the same.

BACKGROUND ART

In a liquid crystal display, both surfaces of a liquid crystal cell in which a liquid crystal is retained are generally provided with a polarizer. Conventionally, in order to visually compensate for retardation caused by birefringence of the liquid crystal cell in a front direction and an oblique direction, a birefringent layer is disposed between the liquid crystal cell and the polarizer. As this birefringent layer, a negative birefringent layer that is obtained by aligning cholesteric liquid crystal molecules on an alignment substrate and whose refractive indices (nx, ny, nz) satisfy a negative uniaxiality "nx=ny>nz" usually is used. The refractive indices (nx, ny, nz) respectively indicate refractive indices in three axial directions in the birefringent layer. The axial directions of the refractive indices (nx, ny, nz) in the birefringent layer are indicated specifically by arrows in a schematic view of FIG. 2. As mentioned above, the refractive indices nx, ny, nz respectively indicate refractive indices in an X-axis direction, a Y-axis direction and a Z-axis direction. As shown in the figure, the X-axis direction is an axial direction exhibiting a maximum refractive index within the plane, the Y-axis direction is an axial direction perpendicular to the X axis within the plane, and the Z-axis direction is a thickness direction perpendicular to the X axis and the Y axis.

As such a birefringent layer, a compensation plate obtained by applying a coating solution of a liquid crystal polymer onto an alignment substrate so as to align the liquid crystal polymer in a cholesteric manner has been disclosed (see Japanese Patent 2660601, for example). More specifically, an example thereof can include a birefringent layer constituted by a cholesteric liquid crystal polymer in which the product of a helical pitch of a cholesteric structure and a refractive index is not larger than 400 nm, and this birefringent layer compensates for a visual angle (see JP 3(1991)-67219 A, for example). JP 3(1991)-67219 A discloses that, in order to achieve a property that the liquid crystal polymer exhibiting a cholesteric liquid crystalline phase oriented substantially in parallel with the substrate is substantially isotropic with respect to visible light within a flat surface, its cholesteric pitch has to be shorter than a visible light wavelength (about 400 nm to 800 nm). Also disclosed is that, in order to prevent the undesired coloration caused by selective reflection owing to the cholesteric structure of the liquid crystal polymer, the product of the refractive index of a birefringent phase and the helical pitch has to be shorter than 400 nm, for example.

DISCLOSURE OF INVENTION

However, even in a retardation plate having the above-described cholesteric layer, there still is the coloration caused by the selective reflection. Thus, when such a plate is used for a liquid crystal display or the like, it has not been possible to achieve an excellent display quality.

Then, an object of the present invention is to provide an optical film having a cholesteric layer in which the coloration caused by selective reflection is reduced.

In order to achieve the above-mentioned object, an optical film of the present invention is an optical film including a cholesteric layer. Constituent molecules of the layer are oriented while having a cholesteric structure, and the layer has a selective reflection wavelength range from 100 nm to 320 nm.

In the present invention, the cholesteric layer also can be called a layer having a pseudo-layer structure, so-called a planar structure or a Granjean structure, in which the constituent molecules of the layer have a helical structure and a screw axis thereof is oriented substantially perpendicularly to the in-plane direction. Also, the state in which the "constituent molecules have a cholesteric structure" in the present invention is not limited to the case where liquid crystalline compounds are in a cholesteric liquid crystalline phase, for example, but also includes the state where non-liquid crystalline compounds are oriented in a helical manner as in the cholesteric liquid crystalline phase. Incidentally, this state is not a liquid crystalline phase.

In an attempt to solve the above-noted problem, the inventors carried out a detailed examination. As a result, it was found that the coloration occurred due to the selective reflection owing to the helical structure of the liquid crystalline compounds even in a retardation plate having a cholesteric layer having a selective reflection wavelength of not longer than 400 nm, i.e., 330 nm to 400 nm, and this coloration brought a single hue b value during transmittance measurement to 1.2 or more. In the case where this retardation plate was attached to polarizing plates, there were problems in that light leakage in the normal direction occurred over the entire surface in a crossed Nicols state and the transmittance between crossed polarizing plates at 427 nm was 0.235% larger than the transmittance between the crossed polarizing plates alone. When black display in the crossed Nicols state was visually checked, a front surface was found to look blue. From these results, such light leakage is conceived to be attributable to the influence of the selective reflection on the visible light range (about 400 nm to 700 nm), and even in a selective reflection wavelength of 330 nm to 400 nm, when this retardation plate is used as the birefringent layer, it was found to be difficult to form a liquid crystal display having an excellent display quality.

Accordingly, the inventors conducted further studies and found the following. A cholesteric layer formed by providing a "liquid crystal monomer," which will be described later, controlling a blend ratio of this liquid crystal monomer and a chiral dopant, orienting the liquid crystal monomer into a cholesteric structure by the chiral dopant, and then fixing that orientation by polymerization or cross-linking can control the selective reflection wavelength range to be 100 nm to 320 nm. Within this range, it is possible to avoid the conventional problem of light leakage. It should be noted that the inventors found for the first time that using the liquid crystal monomer and controlling the blend ratio made it possible to control the selective reflection wavelength range.

Such an optical film in which the selective reflection wavelength range is controlled to the above-noted range prevents coloration caused by the selective reflection in the conventional case, for example. In other words, as the selective reflection wavelength is closer to the visible wavelength (400 nm or longer), the influence on the visible light region increases, causing light leakage and thus coloration, whereas by controlling the selective reflection wavelength to the above-mentioned range, light leakage is suppressed. Thus, by using the optical film of the present invention as a retardation film, a viewing angle is expanded, so that an excellent display quality can be achieved in both the front direction and the oblique direction. Accordingly, the optical film of the present invention is also useful for various image display apparatus such as a liquid crystal display and the like.

Next, a retardation film of the present invention includes the above-described optical film of the present invention. Also, a polarizing plate of the present invention includes the above-mentioned retardation film of the present invention and a polarizing film and is especially useful as a polarizing plate for optical compensation. Furthermore, the retardation film or the polarizing plate of the present invention is useful for various image display apparatus such as a liquid crystal display and an electroluminescence (EL) display.

BEST MODE FOR CARRYING OUT THE INVENTION

As described above, an optical film of the present invention is an optical film including a cholesteric layer in which constituent molecules are oriented while having a cholesteric structure, and is characterized in that the layer has a selective reflection wavelength range from 100 nm to 320 nm.

In the case where the cholesteric layer is formed using a liquid crystal monomer as described later, for example, a center wavelength of the selective reflection wavelength range $\lambda$ (nm) can be expressed by the equation below.

$$\lambda = n \cdot P$$

In the above equation, n indicates an average refractive index of the liquid crystal monomer, and P indicates a helical pitch ($\mu$m) of the cholesteric layer. The average refractive index n is expressed by "$(n_o + n_e)/2$" and usually ranges from 1.45 to 1.65, with $n_o$ indicating an ordinary index of the liquid crystal monomer and $n_e$ indicating an extraordinary index of the liquid crystal monomer.

The upper limit of the selective reflection wavelength range is 320 nm as described above and preferably is 300 nm. On the other hand, the lower limit thereof is 100 nm as described above and preferably is 150 nm. When exceeding 320 nm, the selective reflection wavelength range is in the visible light region, causing problems, for example, the above-described coloration and decoloration. On the other hand, an optical film having a selective reflection wavelength range shorter than 100 nm has the following problem. That is, as described later, when manufacturing the optical film of the present invention, the selective reflection wavelength range can be set by controlling an added ratio of constituent materials such as the liquid crystal monomer etc. and the chiral dopant. As a means of shifting the selective reflection wavelength range to a shorter wavelength side, there is a method of increasing the amount of the chiral dopant to be added, for example. When the added amount of the chiral dopant increases, the temperature range in which the constituent materials such as the liquid crystal monomer are oriented in a cholesteric manner, i.e., are in a liquid crystalline phase becomes very narrow. Thus, the temperature for aligning the constituent materials in a cholesteric manner needs to be controlled strictly during manufacture, causing a problem that the manufacture becomes difficult.

In the optical film of the present invention, it is preferable that the above-mentioned refractive indices (nx, ny, nz) in the three axial directions satisfy nx≈ny>nz, for example. Such an optical film can be used as a so-called negative C-Plate retardation plate.

Figure 2:
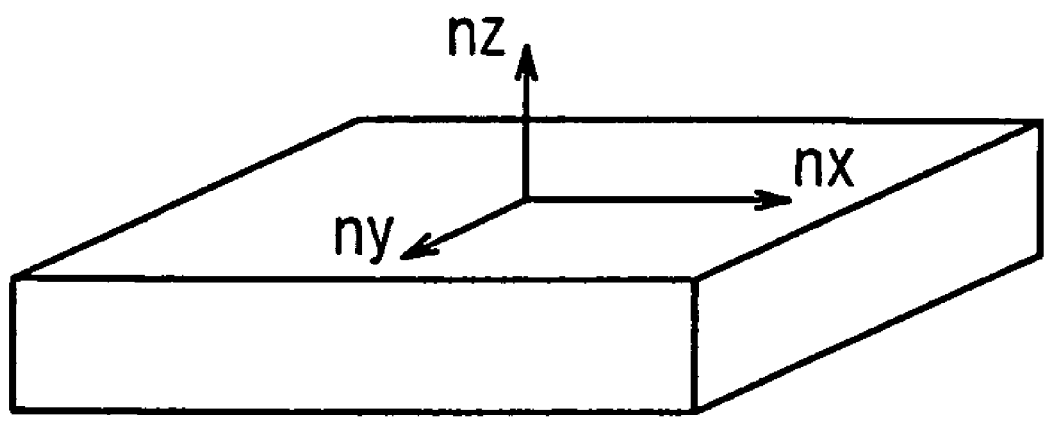
FIG. 2 is a schematic view showing axial directions of refractive indices.

In the present invention, an in-plane retardation ($\Delta$nd) of the cholesteric layer at 590 nm is, for example, 2 nm or smaller and preferably is 1.5 nm or smaller. It is easier to control the in-plane retardation to the above-noted range by controlling the selective reflection wavelength to the range of 100 nm to 320 nm. The in-plane retardation ($\Delta$nd) is expressed by the equation below. In the equation below, as in FIG. 2 described above, "nx, ny" indicate refractive indices in an X-axis direction and a Y-axis direction that are orthogonal to each other within the plane, with the X axis being a direction exhibiting a maximum refractive index within the plane. Further, "d" indicates a film thickness.

$$\Delta nd = (nx - ny) \cdot d$$

In order to control the selective reflection wavelength range to the above-noted range, it is preferable that the cholesteric layer contains a chiral dopant. The chiral dopant in the present invention is, for example, a chemical compound having a function of aligning a liquid crystal monomer or a liquid crystal polymer described later so as to have a cholesteric structure.

The chiral dopant is not particularly limited in kind as long as it can align constituent molecules of the cholesteric layer to have a cholesteric structure as described above, but the chiral dopants that will be described later are preferable, for example.

In these chiral dopants, the helical twisting power thereof preferably is at least $1 \times 10^{-6}$ nm$^{-1}$·(wt %)$^{-1}$, more preferably is at least $1 \times 10^{-5}$ nm$^{-1}$·(wt %)$^{-1}$, further preferably ranges from $1 \times 10^{-5}$ to $1 \times 10^{-2}$ nm$^{-1}$·(wt %)$^{-1}$, and particularly preferably ranges from $1 \times 10^{-4}$ to $1 \times 10^{-3}$ nm$^{-1}$·(wt %)$^{-1}$. By using the chiral dopant with the above helical twisting power, for example, the helical pitch of the formed cholesteric layer can be controlled to the range described below, making it duly possible to control the selective reflection wavelength range to the above-noted range.

In general, the helical twisting power refers to an ability to give a twist to liquid crystal materials such as a liquid crystal monomer and a liquid crystal polymer, which will be described later, thus aligning those materials in a helical manner and is expressed by the equation below.

Helical twisting power=1/[Cholesteric pitch (nm)× Weight ratio of chiral dopant (wt %)]

In the above equation, the weight ratio of chiral dopant refers to the ratio (weight ratio) of the chiral dopant in a mixture containing, for example, a liquid crystal monomer or a liquid crystal polymer and the chiral dopant and is expressed by the equation below.

Weight ratio of chiral dopant (wt %)=[$X/(X+Y)$]×100

X: Weight of chiral dopant
Y: Weight of liquid crystal monomer or liquid crystal polymer Further, the helical pitch in the cholesteric layer preferably ranges from 0.01 to 0.25 $\mu$m, for example, more preferably ranges from 0.03 to 0.20 $\mu$m and particularly preferably ranges from 0.05 to 0.15 μm. The helical pitch of 0.01 μm or larger achieves, for example, a sufficient orientation, whereas the helical pitch of 0.25 μm or smaller makes it possible to suppress sufficiently optical rotatory power on a shorter wavelength side of visible light, for example, thus preventing light leakage sufficiently for use as a retardation film for compensation under polarized light. Also, by using the chiral dopant having the above-described helical twisting power, it becomes possible to control the helical pitch of the formed cholesteric layer to the above-noted range.

Since the optical film of the present invention has a selective reflection wavelength range controlled to the above-noted range, it has a single hue b value of, for example, 1.2 or smaller and less coloration, achieving truly excellent optical characteristics. The single hue b value more preferably is 1.1 or smaller and particularly preferably is 1.0 or smaller. Further, the crossed hue b value of the optical film of the present invention is, for example, −0.5 to 1.0, more preferably is −0.3 to 0.8 and particularly preferably is −0.1 to 0.8. In addition, the crossed transmittance at 430 nm of the optical film of the present invention is, for example, 0.15 or smaller, preferably is 0.10 or smaller and more preferably is 0.08 or smaller.

The single hue b value is defined by the HunterLab colorimetric system (Hunter, R. S.: J. Opt. Soc. Amer., 38, 661(A), 1094(A) (1948); J. Opt. Soc. Amer., 48, 985 (1958)). More specifically, in accordance with JIS K 7105 5.3, for example, tristimulus values (X, Y, Z) of a sample are measured using a spectrophotometer or a photoelectric colorimeter and substituted into the Hunter equation, which is shown below as a color difference equation in the L, a, b space, thereby calculating a single hue b value. Usually, a C light source is used for this measurement. For example, using an integrating-sphere spectral transmittance meter (trade name DOT-3C; manufactured by Murakami Color Research Laboratory), the transmittance as well as the single hue b value can be measured.

$$\text{Single hue } b = 7.0 \times (Y - 0.847Z)/Y^{1/2}$$

The crossed hue b value mentioned above can be measured in the following manner. The polarizing plates are arranged in a crossed Nicols state. Between these polarizing plates, the optical film is placed, and a hue b1 is measured based on the HunterLab colorimetric system described above. On the other hand, a hue b2 of the crossed Nicol polarizing plates alone is measured without arranging any optical film. Then, by subtracting the hue b2 from the hue b1 (b1−b2), the crossed hue b value is obtained.

In the present invention, it is preferable that the constituent molecules are, for example, a non-liquid crystalline polymer, and the non-liquid crystalline polymer is obtained by polymerizing or cross-linking a liquid crystalline monomer that is oriented while having a cholesteric structure. With this structure, as described later, because of its liquid crystalline property, the monomer can be oriented while having a cholesteric structure, and this orientation can be fixed by polymerizing the monomer. Although the liquid crystalline monomer is used, the polymer that is polymerized by the above fixing comes to have a non-liquid crystalline property. Thus, the formed cholesteric layer has a cholesteric structure as in a cholesteric liquid crystalline phase, but is not constituted by liquid crystal molecules. Therefore, there occurs no transformation peculiar to the liquid crystal molecules, i.e., between a liquid crystalline phase, a glassy phase and a crystalline phase due to temperature change. Consequently, an extremely stable optical film whose cholesteric structure is not affected by temperature change can be achieved, which is particularly useful as a retardation film for optical compensation, for example.

It is preferable that the liquid crystalline monomer is represented by the chemical formula (1) below. Although such liquid crystalline monomers generally are nematic liquid crystalline monomers, the liquid crystalline monomer of the present invention is given a twist by the chiral dopant and eventually achieves a cholesteric structure. Also, since the monomer needs to be polymerized or cross-linked for fixing the orientation in the cholesteric layer, it is preferable that the monomer contains at least one of a polymerizable monomer and a cross-linkable monomer.

It is preferable that the cholesteric layer further contains at least one of a polymerizing agent and a cross-linking agent, and a ultraviolet curing agent, a photocuring agent or a thermosetting agent can be used, for example.

The ratio of the liquid crystalline monomer in the cholesteric layer preferably ranges from 75 wt % to 95 wt % and more preferably ranges from 80 wt % to 90 wt %. Also, the ratio of a chiral dopant to the liquid crystalline monomer preferably ranges from 5 wt % to 23 wt % and more preferably ranges from 10 wt % to 20 wt %. Further, the ratio of the cross-linking agent or the polymerizing agent to the liquid crystalline monomer preferably ranges from 0.1 wt % to 10 wt %, more preferably ranges from 0.5 wt % to 8 wt %, and particularly preferably ranges from 1 wt % to 5 wt %.

The thickness of the optical film is not particularly limited. However, in the case where this optical film is used as a retardation film for compensation, for example, it has a thickness ranging preferably from 0.1 to 10 μm, more preferably from 0.5 to 8 μm and particularly preferably from 1 to 5 μm, considering the prevention of orientation irregularities and transmittance drop, the selective reflection property, the prevention of coloration, the productivity etc.

The optical film of the present invention may be formed of, for example, the cholesteric layer as described above, but further can include a substrate and be a laminate of the substrate and the cholesteric layer formed on the substrate.

Next, a method for manufacturing an optical film of the present invention is a method for manufacturing an optical film including a cholesteric layer whose constituent molecules are oriented while having a cholesteric structure. The method includes forming an expanded layer by expanding onto an alignment base a coating solution that contains a liquid crystalline monomer, a chiral dopant and at least one of a polymerizing agent and a cross-linking agent and has a ratio of the chiral dopant to the liquid crystalline monomer ranging from 5 wt % to 23 wt %, subjecting the expanded layer to a heat treatment so that the liquid crystalline monomer is oriented while having a cholesteric structure, and subjecting the expanded layer to at least one of a polymerization treatment and a cross-linking treatment so as to fix the orientation of the liquid crystalline monomer and form a cholesteric layer of a non-liquid crystalline polymer. Such a manufacturing method makes it possible to manufacture an optical film of the present invention having the above-described selective reflection wavelength range. The inventors found for the first time that, by controlling the blend ratio of the liquid crystalline monomer and the chiral dopant as described above, the selective reflection wavelength range can be controlled to the range from 100 nm to 320 nm.

The following is a specific example of a method for manufacturing an optical film of the present invention. First, the coating solution that contains the liquid crystalline monomer, the chiral dopant and at least one of the crosslinking agent and the polymerizing agent is prepared.

As the liquid crystalline monomer, a nematic liquid crystalline monomer is preferable, for example. More specifically, a monomer represented by the formula (1) below can be used. The liquid crystalline monomer may be one kind or a combination of two or more kinds.

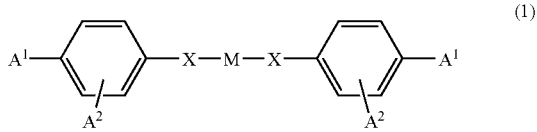
(1)

In the formula (1) above, $A^1$ and $A^2$ are each a polymerizable group and are identical or different, or one of $A^1$ and $A^2$ is hydrogen. X is each a single bond, —O—, —S—, —C=N—, —O—CO—, —CO—O—, —O—CO—O—, —CO—NR—, —NR—CO—, —NR—, —O—CO—NR—, —NR—CO—O—, —CH$_2$—O— or —NR—CO—NR, in which R is H or $C_1$-$C_4$-alkyl and M is a mesogenic group.

In the formula (1) above, Xs may be identical or different but preferably are identical.

In the monomer of the formula (1) above, $A^2$ preferably is ortho to $A^1$ at each occurrence.

Further, it is preferable that $A^1$ and $A^2$ mentioned above are each, independently from one another, represented by the formula below.

(2)

It is preferable that $A^1$ and $A^2$ are identical.

In the formula (2) above, Z is a crosslinkable group, X is similar to that of the formula (1) above, Sp is a spacer formed of a straight-chain or branched chain alkyl group having 1 to 30 carbon atoms, and n is 0 or 1. The carbon chain in the Sp may be interrupted by ether oxygen, thioether sulfur or nonadjacent imino or $C_1$-$C_4$-alkylimino groups.

In the formula (2) above, it is preferable that Z is any of the radicals represented by the formulae below. In the formulae below, R is, for example, methyl, ethyl, n-propyl, i-propyl, n-butyl, i-butyl or t-butyl.

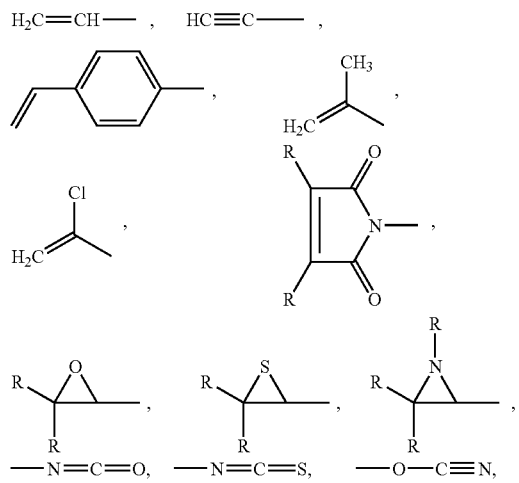

Also, in the formula (2) above, it is preferable that Sp is any of the radicals represented by the formulae below. In the formulae below, it is preferable that m is 1 to 3 and p is 1 to 12.

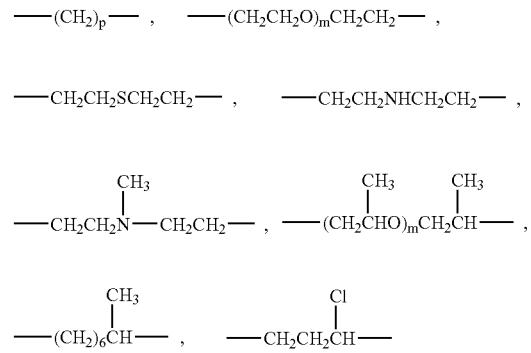

In the formula (1) above, it is preferable that M is represented by formula (3) below. In the formula (3) below, X is similar to X in the formula (1) above. Q is, for example, substituted or unsubstituted alkylene or aromatic hydrocarbon radicals or may be a substituted or unsubstituted straight-chain or branched-chain $C_1$-$C_{12}$-alkylene.

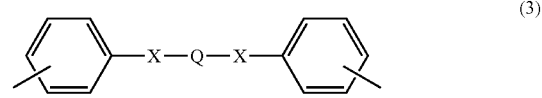
(3)

When Q is the aromatic hydrocarbon radicals, the radicals represented by the formulae below or substituted analogs thereof are preferable, for example.

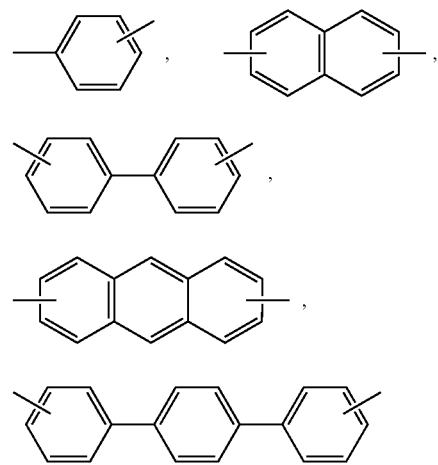

Substituted analogs of the aromatic hydrocarbon radicals represented by the formulae above may carry 1 to 4 substituents per aromatic ring, for example, or one or two substituents per aromatic ring or per group. The substituents may be identical or different. The substituents can be, for example, $C_1$-$C_4$-alkyl, nitro, halogen such as F, Cl, Br or I, phenyl or $C_1$-$C_4$-alkoxy.

Specific examples of the liquid crystalline monomer can include monomers represented by the formulae (4) to (19) below.

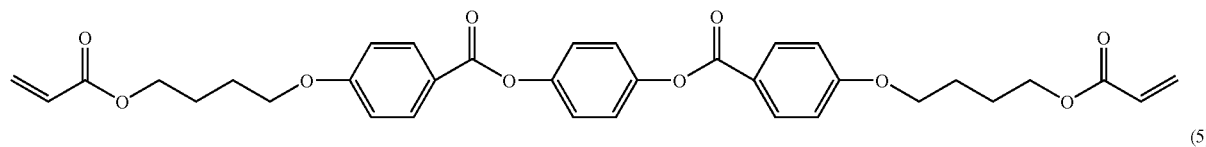
(4)
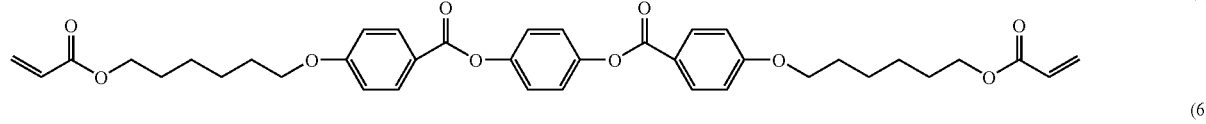
(5)
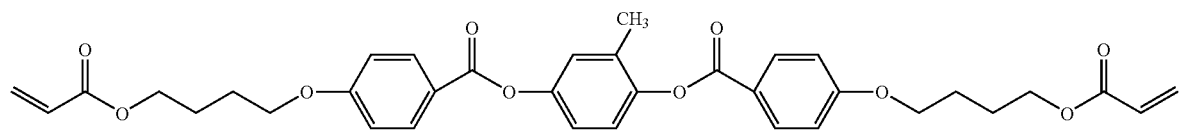
(6)
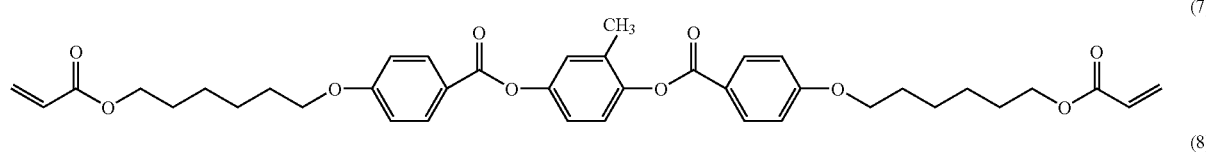
(7)
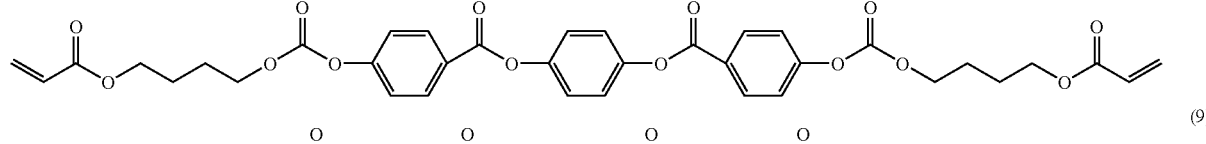
(8)
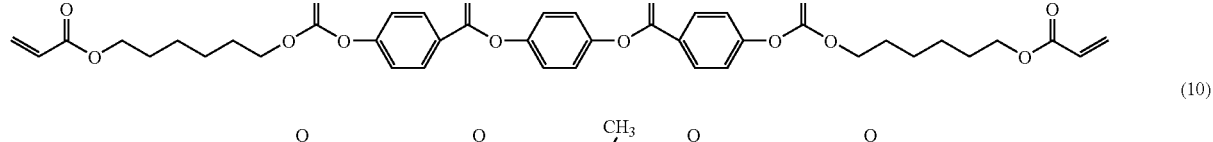
(9)
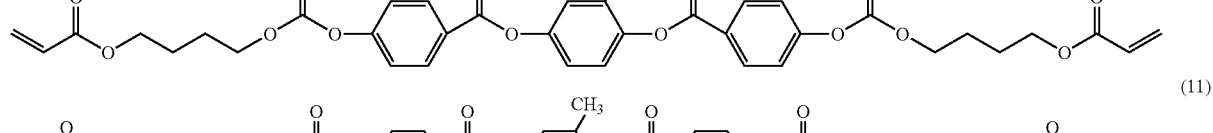
(10)
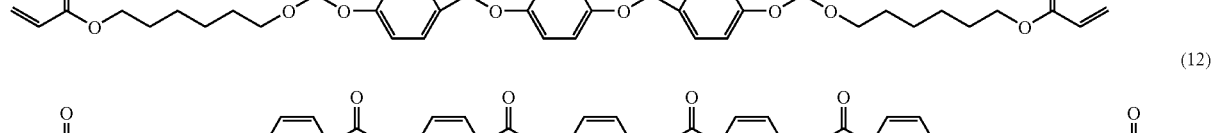
(11)
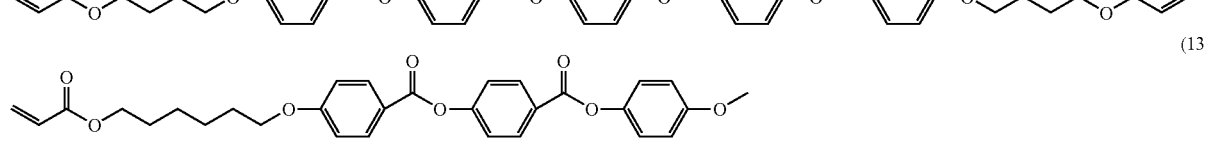
(12)
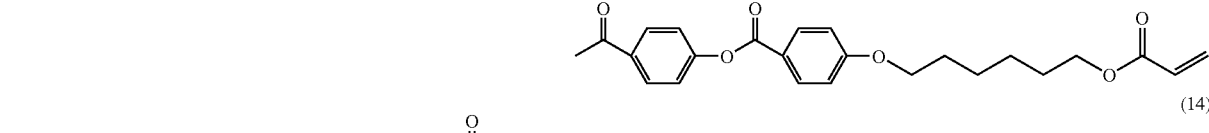
(13)
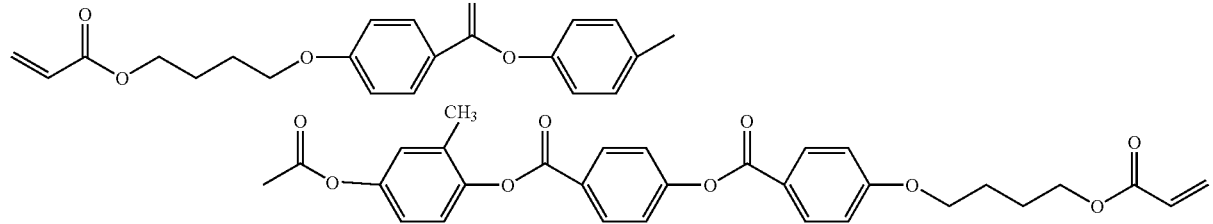
(14)

-continued

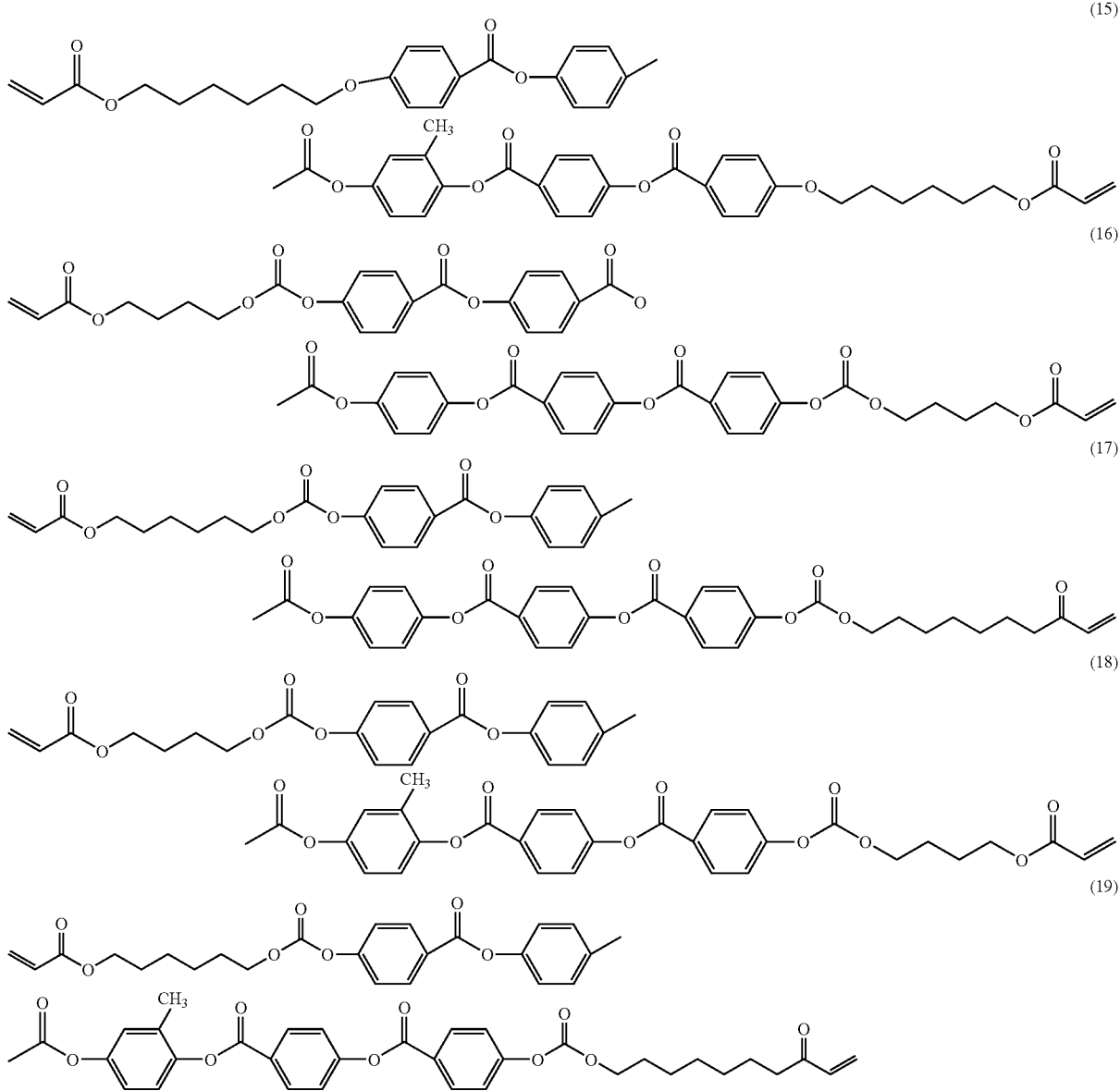

The temperature range in which the liquid crystalline monomer shows a liquid crystalline property varies depending on their kinds but preferably ranges from 40° C. to 120° C., for example, more preferably ranges from 50° C. to 100° C. and particularly preferably ranges from 60° C. to 90° C.

Although there is no particular limitation on the chiral dopant as long as it twists and aligns the liquid crystalline monomer so as to have a cholesteric structure as described above, for example, a polymerizable chiral dopant is preferable. The above-described chiral dopants can be used. These chiral dopants may be used alone or in combination of two or more.

More specifically, the polymerizable chiral dopant can be, for example, chiral compounds represented by the general formulae (20) to (23) below.

$$(Z\text{-}X^5)_n Ch \qquad (20)$$

$$(Z\text{-}X^2\text{-}Sp\text{-}X^5)_n Ch \qquad (21)$$

$$(P^1\text{-}X^5)_n Ch \qquad (22)$$

$$(Z\text{-}X^2\text{-}Sp\text{-}X^3\text{-}M\text{-}X^4)_n Ch \qquad (23)$$

In the above formulae, Z is similar to that in the formula (2) above, Sp is similar to that in the formula (2) above, $X^2$, $X^3$ and $X^4$ are each, independently from one another, a chemical single bond, —O—, —S—, —O—CO—, —CO—O—, —O—CO—O—, —CO—NR—, —NR—CO—, —O—CO—NR—, —NR—CO—O— or —NR—CO—NR—, and R is H or $C_1$-$C_4$-alkyl. $X^5$ is a chemical single bond, —O—, —S—, —O—CO—, —CO—O—, —O—CO—O—, —CO—NR—, —NR—CO—, —O—CO—NR—, —NR—CO—O—, —NR—CO—NR, —$CH_2$O—, —O—$CH_2$—, —CH=N—, —N=CH— or —N≡N—. Similarly to the above, R is H or $C_1$-$C_4$-alkyl. Similarly to the above, M is a mesogenic group. $P^1$ is hydrogen, a $C_1$-$C_{30}$-alkyl group, a $C_1$-$C_{30}$-acyl group or a $C_3$-$C_8$-cycloalkyl group substituted by 1 to 3 $C_1$-$C_6$-alkyl, and n is an integer from 1 to 6. Ch is an n-valent chiral group. In the formula (23) above, it is preferable that at least one of $X^3$ and $X^4$ is —O—CO—O—, —O—CO—NR—, —NR—CO—O— or —NR—CO—NR—. In the formula (22) above, when $P^1$ is an alkyl group, an acyl group or a cycloalkyl group, its carbon chain may be interrupted by ether oxygen, thioether sulfur or nonadjacent imino or $C_1$-$C_4$-alkylimino groups, for example.

Examples of the above-noted chiral group of Ch include radicals represented by the formulae below.

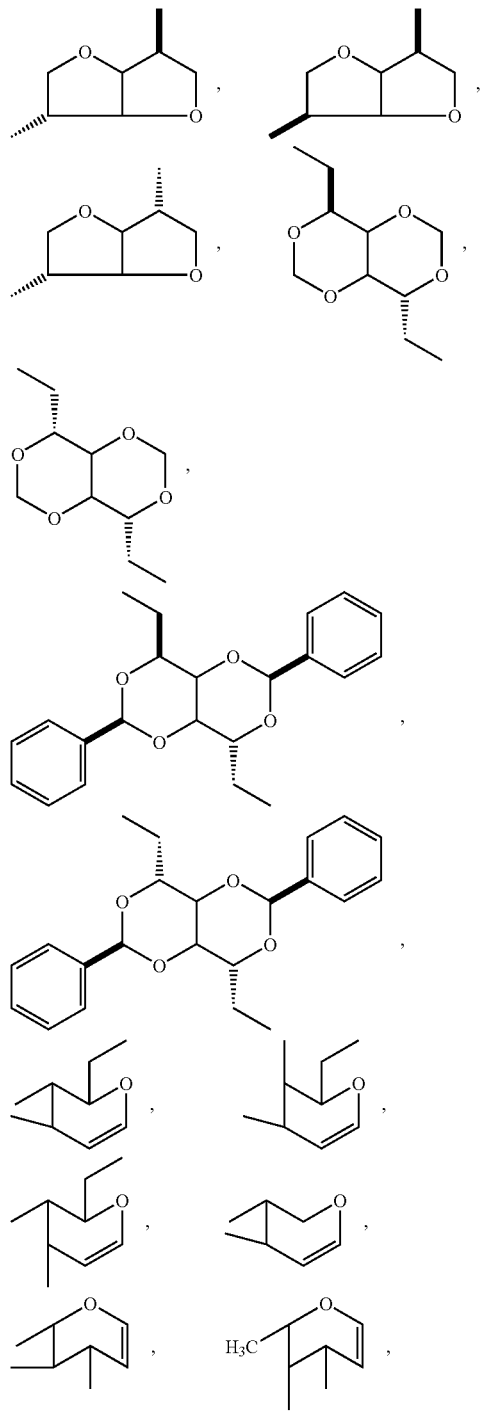

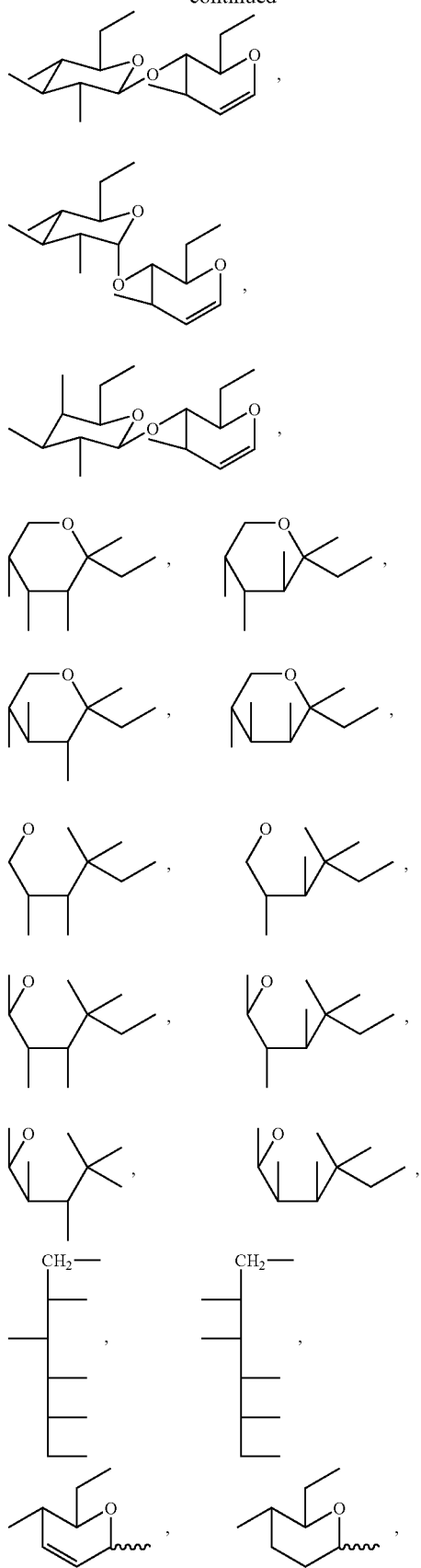

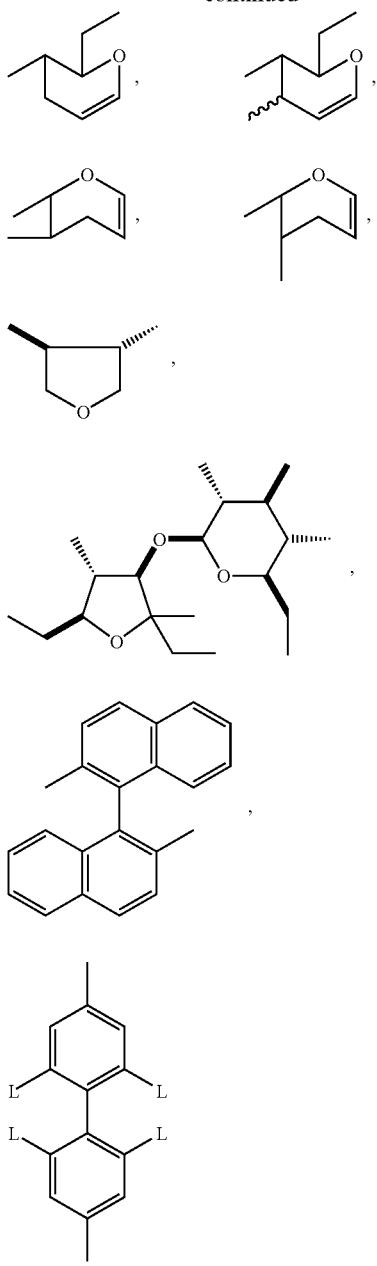

In the above radicals, L is $C_1$-$C_4$-alkyl, $C_1$-$C_4$-alkoxy, halogen, COOR, OCOR, CONHR or NHCOR, and R is $C_1$-$C_4$-alkyl. Terminal ends in the radicals represented by the formulae above indicate dangling bonds with the adjacent groups.

Among the above radicals, radicals represented by the formulae below are particularly preferable.

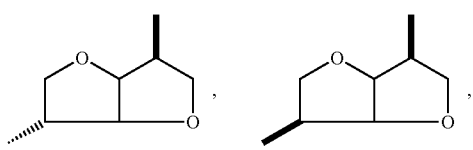

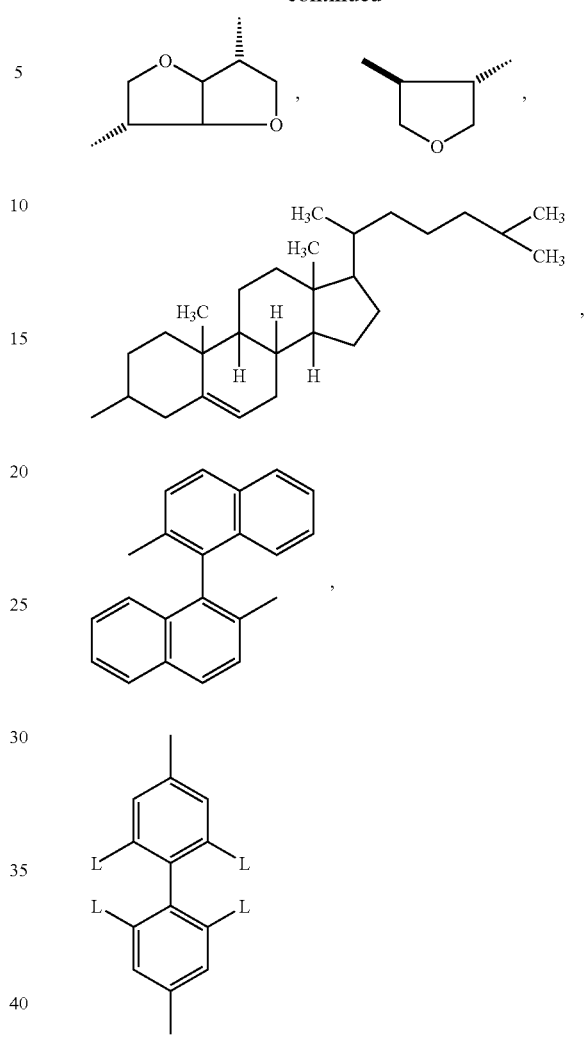

It is preferable that the chiral compound represented by the formula (21) or (23) above is, for example, a radical in which n is 2, Z is $H_2C=CH-$ and Ch is represented by any of the formulae below.

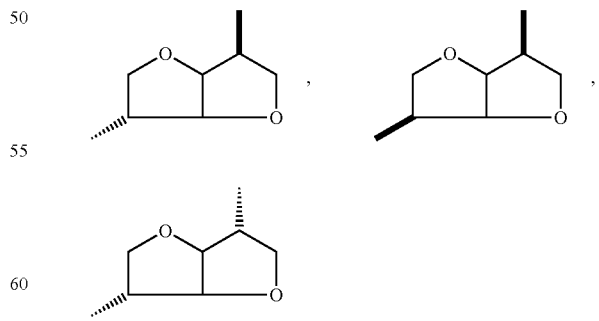

Specific examples of the chiral compound can include compounds represented by the formulae (24) to (44) below. Incidentally, these chiral compounds have a helical twisting power of at least $1 \times 10^{-6}$ $nm^{-1} \cdot (wt\ \%)^{-1}$.

(24) (25) (26) (27)
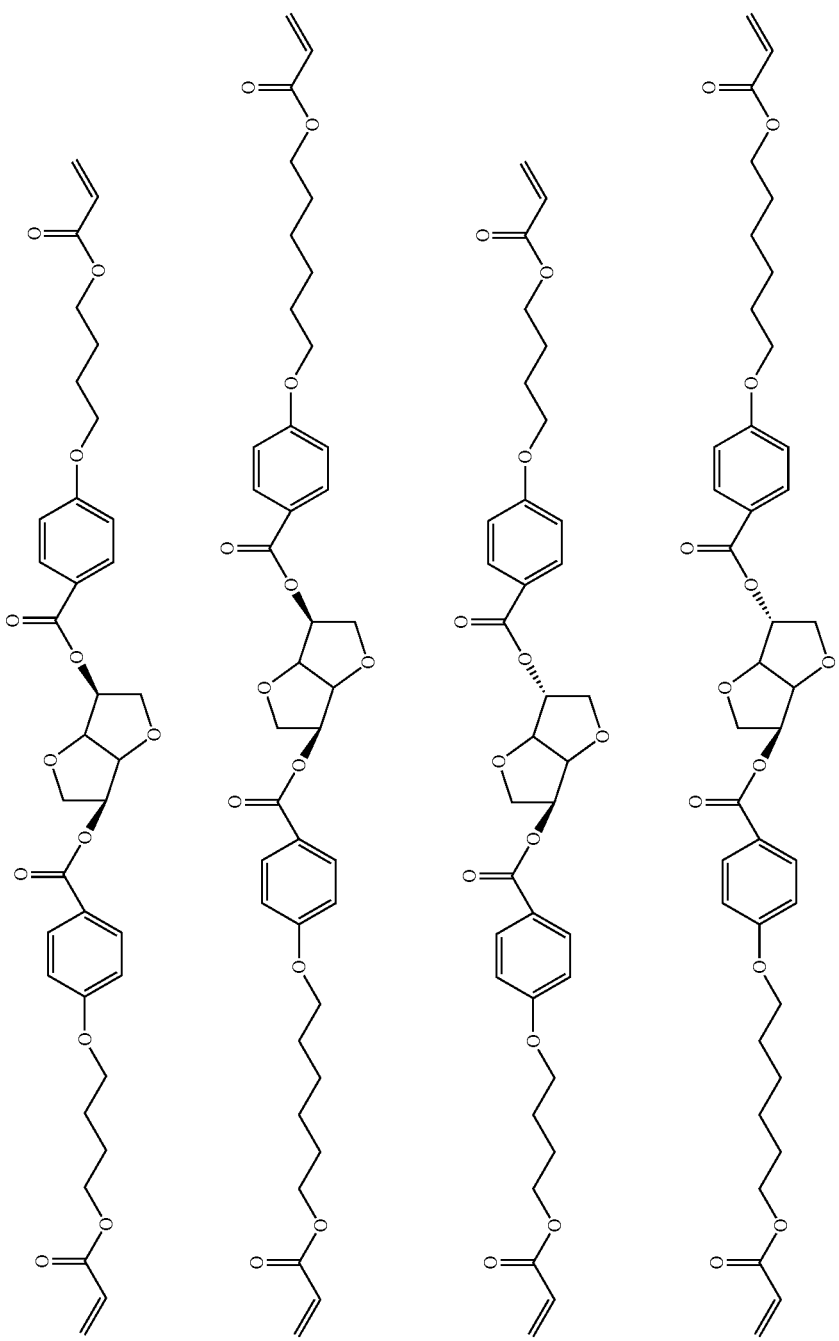

-continued
(28) 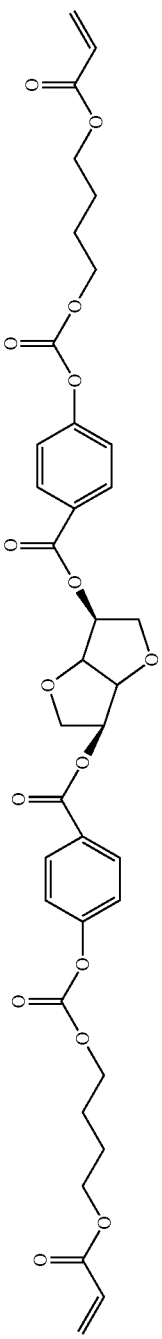
(29) 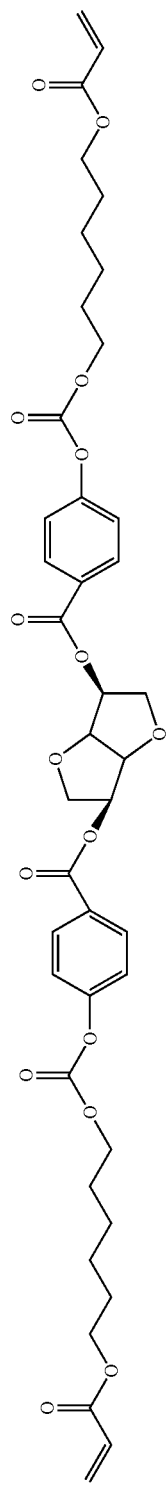
(30) 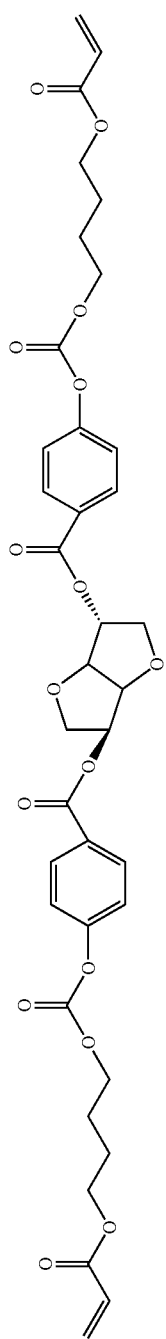
(31) 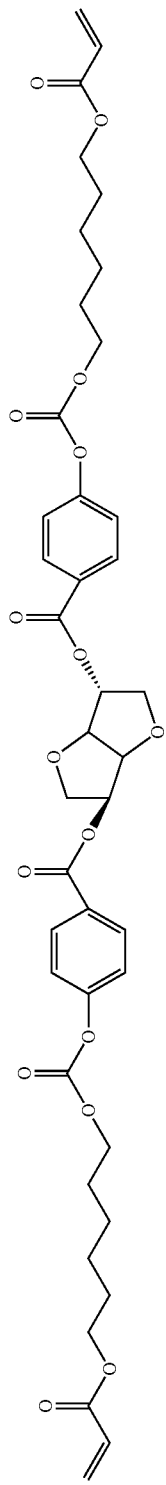

-continued
(32) 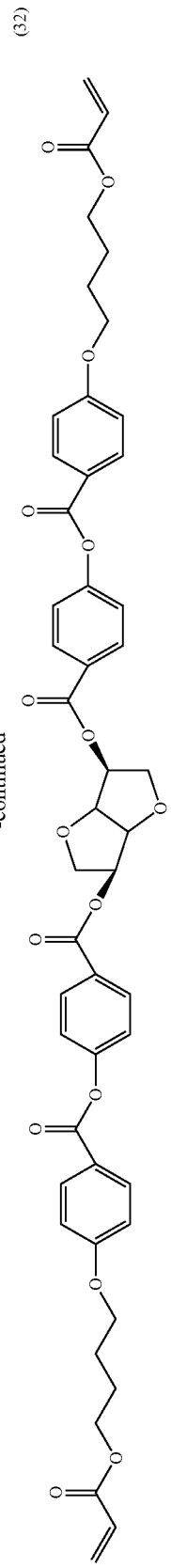 (33) 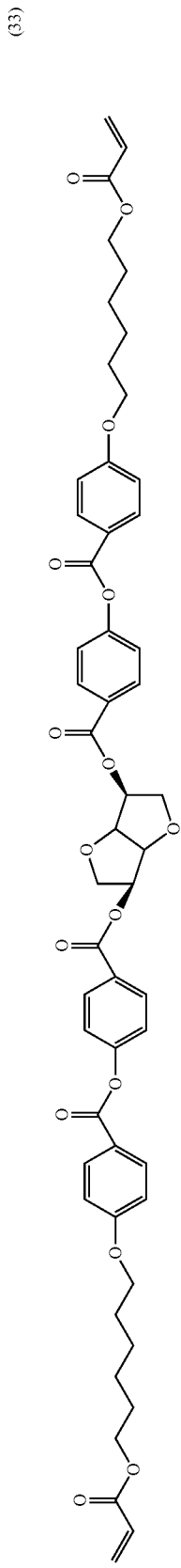 (34) 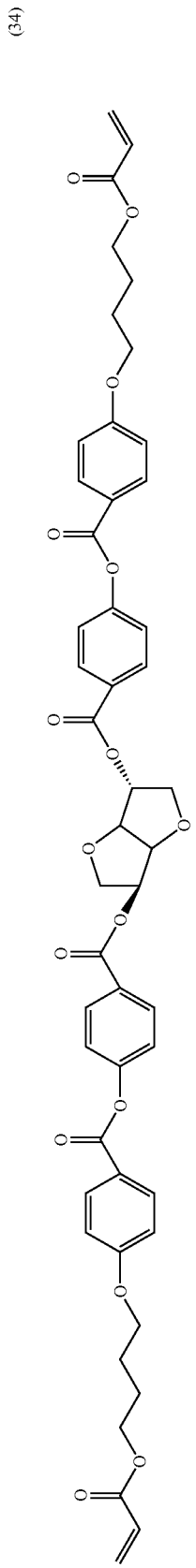 (35) 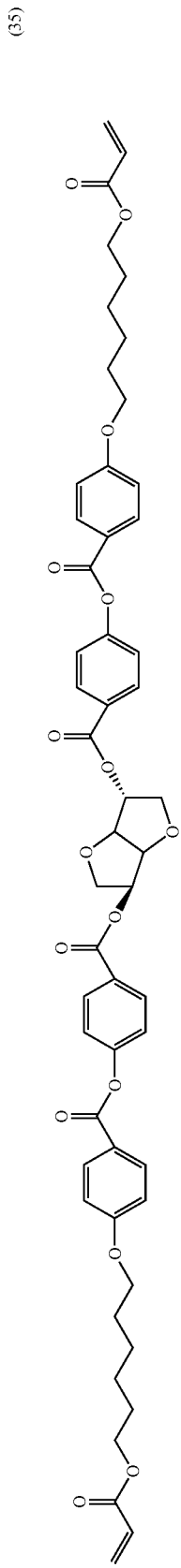

-continued
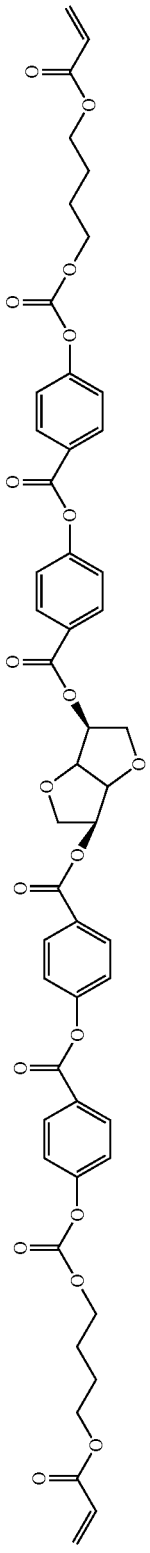
(36)
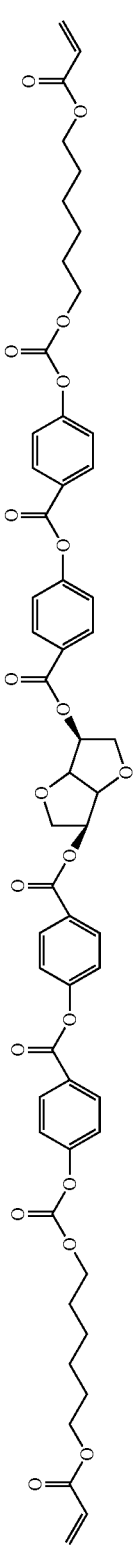
(37)
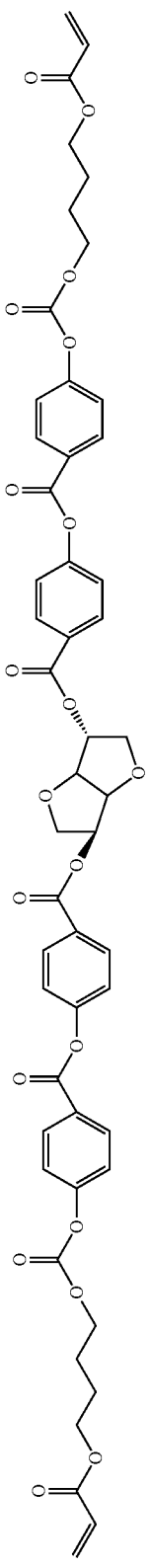
(38)
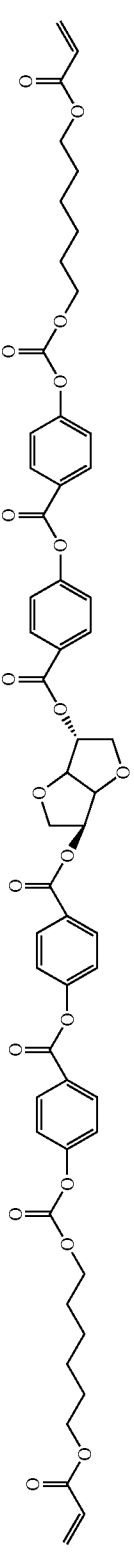
(39)

-continued
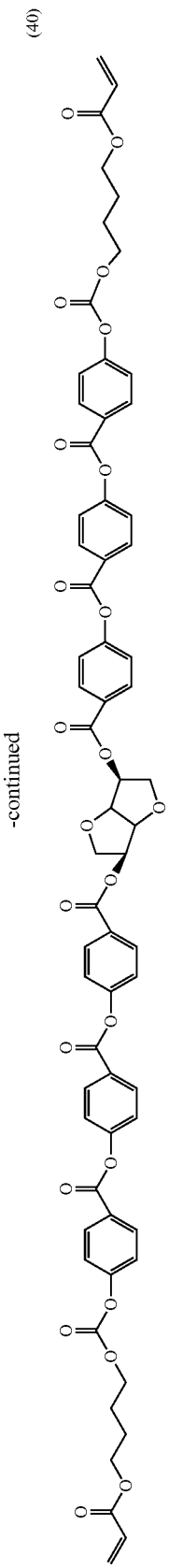
(40)
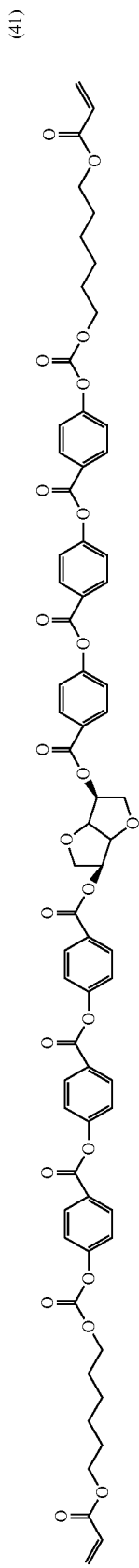
(41)
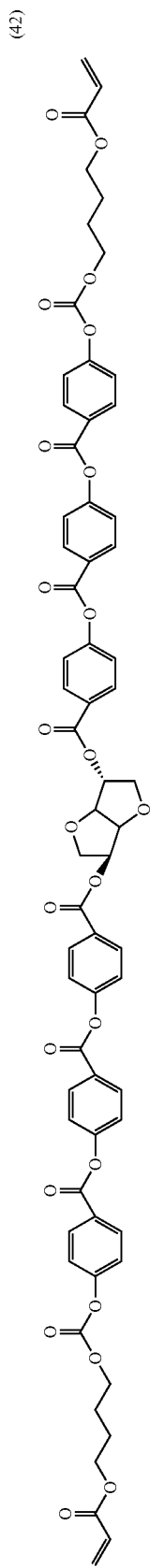
(42)
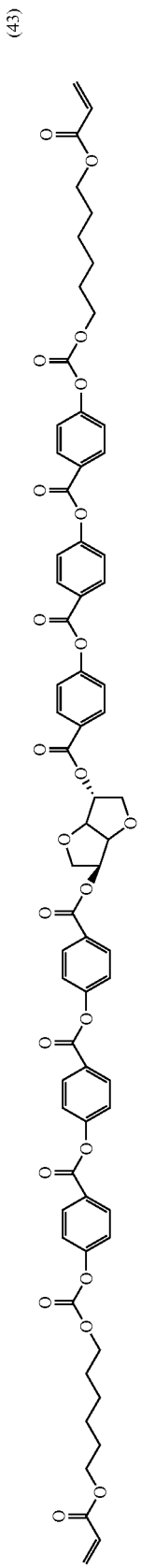
(43)
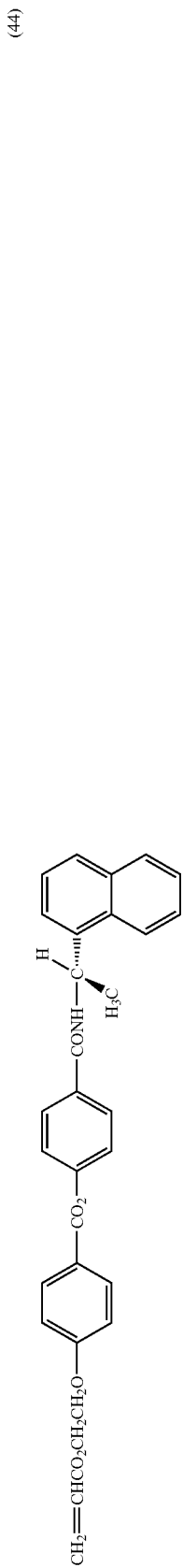
(44)

Other than the above-described chiral compounds, chiral compounds mentioned in, for example, DE-A 4342280, and German patent applications No. 19520660.6 and No. 19520704.1 can be used preferably.

The polymerizing agent and the cross-linking agent are not particularly limited but can be agents below, for example. As the polymerizing agent, benzoyl peroxide (BPO), azobisisobutyronitrile (AIBN) or the like can be used, for example. As the cross-linking agent, an isocyanate-based cross-linking agent, an epoxy-based cross-linking agent, a metal chelate cross-linking agent or the like can be used, for example. These agents may be used alone or in combination of two or more.

The coating solution can be prepared by, for example, dissolving or dispersing the liquid crystalline monomer or the like in a suitable solvent. The solvent is not particularly limited but can be, for example, halogenated hydrocarbons such as chloroform, dichloromethane, carbon tetrachloride, dichloroethane, tetrachloroethane, methylene chloride, trichloroethylene, tetrachloroethylene, chlorobenzene and orthodichlorobenzene; phenols such as phenol, p-chlorophenol, o-chlorophenol, m-cresol, o-cresol and p-cresol; aromatic hydrocarbons such as benzene, toluene, xylene, methoxybenzene and 1,2-dimethoxybenzene; ketone-based solvents such as acetone, methyl ethyl ketone (MEK), methyl isobutyl ketone, cyclohexanone, cyclopentanone, 2-pyrrolidone and N-methyl-2-pyrrolidone; ester-based solvents such as ethyl acetate and butyl acetate; alcohol-based solvents such as t-butyl alcohol, glycerin, ethylene glycol, triethylene glycol, ethylene glycol monomethyl ether, diethylene glycol dimethyl ether, propylene glycol, dipropylene glycol and 2-methyl-2,4-pentanediol; amide-based solvents such as dimethylformamide and dimethylacetamide; nitrile-based solvents such as acetonitrile and butyronitrile; ether-based solvents such as diethyl ether, dibutyl ether, tetrahydrofuran and dioxane; or carbon disulfide, ethyl cellosolve or butyl cellosolve. In particular, toluene, xylene, mesitylene, MEK, methyl isobutyl ketone, cyclohexanone, ethyl cellosolve, butyl cellosolve, ethyl acetate, butyl acetate, propyl acetate and ethyl cellosolve acetate are preferable. These solvents may be used alone or as a mixture of two or more, for example.

The ratio of the chiral dopant to be added is determined suitably according to a desired helical pitch or a desired selective reflection wavelength range, for example. The added ratio with respect to the liquid crystalline monomer ranges from 5 wt % to 23 wt % and preferably ranges from 10 wt % to 20 wt %. As described above, by controlling the added ratio of the chiral dopant to the liquid crystalline monomer in this manner, the selective wavelength range of an optical film to be formed can be set to the above-mentioned range. When the ratio of the chiral dopant to the liquid crystalline monomer is smaller than 5 wt %, it becomes difficult to control the selective reflection wavelength range of an optical film to be formed to a shorter wavelength side. On the other hand, when this ratio is larger than 23 wt %, the temperature range in which the liquid crystalline monomer is oriented in a cholesteric manner, that is, the temperature range in which the liquid crystalline monomer is in a liquid crystalline phase becomes narrow, so that the temperature in an aligning process, which will be described later, has to be controlled precisely, making the manufacturing difficult.

For example, when chiral dopants with equal helical twisting powers are used, the selective reflection wavelength range to be formed is shifted further to the shorter wavelength side with an increase in the added ratio of the chiral dopant with respect to the liquid crystalline monomer. Also, when the added ratios of the chiral dopants with respect to the liquid crystalline monomer are equal, the selective reflection wavelength range of an optical film to be formed is shifted further to the shorter wavelength side with an increase in the helical twisting power of the chiral dopants. As a specific example, in the case where the selective reflection wavelength range of the optical film to be formed is set to range from 200 to 220 nm, it is appropriate that the chiral dopant having a helical twisting power of $5\times10^{-4}$ $nm^{-1}\cdot(wt\ \%)^{-1}$ be blended to be 11 wt % to 13 wt % with respect to the liquid crystalline monomer, for example. In the case where the selective reflection wavelength range is set to range from 290 to 310 nm, it is appropriate that the chiral dopant having a helical twisting power of $5\times10^4$ $nm^{-1}\cdot(wt\ \%)^{-1}$ be blended to be 7 wt % to 9 wt % with respect to the liquid crystalline monomer, for example.

The combination of the liquid crystalline monomer and the chiral dopant is not particularly limited but specifically can be a combination of a monomer agent of the formula (10) above and the chiral dopant of the formula (38) above, that of a monomer agent of the formula (11) above and the chiral dopant of the formula (39) above, or the like.

Further, the added ratio of the cross-linking agent or the polymerizing agent to the liquid crystalline monomer ranges, for example, from 0.1 wt % to 10 wt %, preferably from 0.5 wt % to 8 wt % and more preferably from 1 wt % to 5 wt %. When the ratio of the cross-linking agent or the polymerizing agent to the liquid crystalline monomer is equal to or larger than 0.1 wt %, it becomes sufficiently easy to cure the cholesteric layer, for example. When this ratio is equal to or smaller than 10 wt %, the temperature range in which the liquid crystalline monomer is oriented in a cholesteric manner, that is, the temperature in which the liquid crystalline monomer is in a liquid crystalline phase is sufficient, for example, so that the temperature can be controlled still more easily in the aligning process, which will be described later.

Moreover, for example, various additives may be blended suitably into the coating solution as necessary. Examples of such additives include an antioxidant, a denaturant, a surfactant, a dye, a pigment, a discoloration preventing agent, a UV absorber and the like. These additives may be used alone or in combination of two or more, for example. More specifically, conventionally known materials, for example, phenolic compounds, amine compounds, organic sulfur compounds or phosphinic compounds can be used as the antioxidant, and conventionally known materials, for example, glycols, silicones or alcohols can be used as the denaturant, for example. Furthermore, the surfactant is added, for example, for smoothing the surface of the optical film and can be, for example, a silicone surfactant, an acrylic surfactant, a fluorochemical surfactant or the like. In particular, a silicone surfactant is preferable.

When the liquid crystalline monomer is used as above, the prepared coating solution has a viscosity with an excellent workability in application and expansion, for example. The viscosity of the coating solution usually varies depending on the concentration and temperature of the liquid crystalline monomer. When the monomer concentration in the coating solution is in the above-noted range of 5 wt % to 70 wt %, the viscosity ranges, for example, from 0.2 to 20 mPa·s, preferably from 0.5 to 15 mPa·s and particularly preferably from 1 to 10 mPa·s. More specifically, when the monomer concentration of the coating solution is 30 wt %, the viscosity ranges, for example, from 2 to 5 mPa·s and preferably from 3 to 4 mPa·s. The coating solution viscosity of equal to or larger than 0.2 mPa·s further prevents the coating solution from flowing undesirably during application, for example, whereas the viscosity of equal to or smaller than 20 mPa·s achieves a still better surface smoothness, further prevents thickness unevenness and allows easy application. Incidentally, although the temperature range from 20° C. to 30° C. has been illustrated for the viscosity described above, there is no particular limitation to this temperature.

Next, the coating solution is applied onto the alignment substrate, thus forming the expanded layer.

It is appropriate that the coating solution be flow-expanded by a conventionally known method such as roller coating, spin coating, wire bar coating, dip coating, extrusion method, curtain coating or spray coating. Among these methods, spin coating and extrusion coating are preferable considering the application efficiency.

The alignment substrate is not particularly limited as long as it can align the liquid crystalline monomer. For example, a substrate obtained by rubbing the surface of a plastic film or a plastic sheet of various kinds with a rayon cloth or the like can be used. The above-mentioned plastics is not particularly limited and can be, for example, triacetylcellulose (TAC), polyolefin such as polyethylene, polypropylene or poly(4-methyl pentene-1), polyimide, polyimide amide, polyetherimide, polyamide, polyether ether ketone, polyether ketone, polyketone sulfide, polyethersulfone, polysulfone, polyphenylene sulfide, polyphenylene oxide, polyethylene terephthalate, polybutylene terephthalate, polyethylene naphthalate, polyacetal, polycarbonate, polyarylate, an acrylic resin, polyvinyl alcohol, polypropylene, cellulose-based plastics, an epoxy resin, a phenolic resin or the like. Alternatively, the alignment substrate can be obtained by providing the above-mentioned plastic film or sheet on the surface of a substrate made of metal such as aluminum, copper or steel, a ceramic substrate or a glass substrate or by forming an obliquely deposited film of $SiO_2$ on that surface. Also, it may be possible to use as the alignment substrate a laminate of the above-mentioned plastic film or sheet and a birefringent stretched film that has been subjected to a stretching treatment such as uniaxial stretching to serve as an alignment layer. Furthermore, it is preferable that the substrate itself is birefringent because the rubbing treatment and the lamination of the birefringent film on the surface described above are not necessary. The substrate itself can be made birefringent as above by, for example, casting and extrusion forming other than the stretching treatment during the formation of the substrate.

Subsequently, the expanded layer is subjected to a heat treatment, Since the expanded layer contains the chiral dopant as well as the liquid crystalline monomer, the liquid crystalline monomer that is now in the liquid crystalline phase (the liquid crystalline state) is aligned while being given a twist by the chiral dopant. In other words, the liquid crystalline monomer shows a cholesteric structure (a helical structure).

The temperature condition in the heat treatment can be determined suitably according to, for example, kinds of the liquid crystalline monomer, more specifically, the temperature at which the liquid crystalline monomer shows a liquid crystalline property. Usually, the temperature ranges from 40° C. to 120° C., preferably from 50° C. to 100° C. and more preferably from 60° C. to 90° C. A temperature equal to or higher than 40° C. usually makes it possible to align the liquid crystalline monomer sufficiently, whereas a temperature equal to or lower than 120° C. allows a wide range of selectable alignment bases of various kinds as described above, taking into account heat resistance, for example.

Next, the expanded layer in which the liquid crystalline monomer is oriented is subjected to a cross-linking treatment or a polymerization treatment, thereby polymerizing or cross-linking the liquid crystalline monomer and the chiral dopant. In this manner, the liquid crystalline monomer is polymerized or cross-linked within itself or with the chiral dopant while maintaining the orientation with the cholesteric structure, so that the orientation is fixed. Thus formed polymer is a non-liquid crystalline polymer because the orientation has been fixed.

The polymerization treatment or the cross-linking treatment can be determined suitably depending on, for example, kinds of a polymerizing agent or a cross-linking agent to be used. For example, light irradiation is appropriate in the case of using a photopolymerizing agent or a photocross-linking agent, and ultraviolet irradiation is appropriate in the case of using an ultraviolet polymerizing agent or an ultraviolet cross-linking agent.

By the manufacturing method described above, it is possible to provide, on the alignment substrate, an optical film with a selective reflection wavelength range of 100 nm to 320 nm formed of the non-liquid crystalline polymer that is oriented while having a cholesteric structure. This optical film shows a non-liquid crystalline property because its orientation is fixed as described above. Therefore, it does not transform, for example, between a liquid crystalline phase, a glassy phase and a crystalline phase according to changes in temperature, so that its orientation does not change with temperature. Consequently, it can be used as a high-performance retardation film that is not affected by temperature change. Furthermore, since the selective reflection wavelength range is controlled to the above-noted range, light leakage and the like as described above can be suppressed.

The optical film of the present invention was realized for the first time by the inventors using the above-described liquid crystalline monomer. However, its manufacturing method is not limited to the above but may be a method using the liquid crystalline polymer mentioned above. It should be noted that the use of the liquid crystalline monomer makes it still easier not only to control the selective reflection wavelength range but also to set the viscosity etc. of the coating solution as described above, so that a thin layer can be formed even more easily, leading to an excellent easiness to handle. Moreover, the surface of the formed cholesteric layer achieves an excellent smoothness. Thus, it is possible to form a thinner optical film that has even better quality.

Moreover, the optical film may be peeled off from the alignment substrate and used as it is as a retardation film for compensation as described above, or can be kept laminated on the alignment substrate and used as a retardation plate.

When the optical film is used as a laminate with the alignment substrate, it is preferable that the alignment substrate is a transparent plastic film. The plastic film can be a film formed of, for example, cellulose such as TAC, polyolefin such as polyethylene, polypropylene or poly(4-methyl pentene-1), polyimide, polyamide imide, polyamide, polyetherimide, polyether ether ketone, polyketone sulfide, polyethersulfone, polysulfone, polyphenylene sulfide, polyphenylene oxide, polyethylene terephthalate, polybutylene terephthalate, polyethylene naphthalate, polyacetal, polycarbonate, polyarylate, an acrylic resin, polyvinyl alcohol, polypropylene, cellulose-based plastics, an epoxy resin, a phenolic resin, polynorbornene, polyester, polystyrene, polyvinyl chloride, polyvinylidene chloride, liquid crystalline polymer or the like. These films may be optically isotropic or anisotropic. Among these plastic films, films respectively formed of polypropylene, polyethylene terephthalate and polyethylene naphthalate are preferable, for example, considering a solvent resistance and a heat resistance.

The above-mentioned transparent alignment substrate may be a single layer, for example, or a laminate of different polymers for improving a strength, a heat resistance and adhesion to the polymer and the liquid crystalline monomer, for example.

In addition, the transparent alignment substrate may generate no retardation owing to birefringence, or generate retardation owing to birefringence for the purpose of canceling the polarization state of light reflected by a polarization separating layer, for example. Such canceling of the polarization state improves an efficiency of light utilization and allows the light to have the same polarization state as light from the light source, so that visual hue variation can be suppressed effectively. The transparent substrate generating the retardation owing to birefringence can be, for example, stretched films of various polymers and may be a substrate whose refractive index in the thickness direction is controlled. This controlling can be carried out by, for example, making the polymer film adhere to a heat-shrinkable film and stretching them while heating.

The thickness of the plastic film usually is 5 µm to 500 µm, preferably is 10 to 200 µm and more preferably is 15 to 150 µm. The thickness equal to or larger than 5 µm provides a sufficient strength as the substrate, so that it is possible to prevent a problem of fracture during manufacturing or the like.

Alternatively, the optical film can be transferred from the alignment substrate (in the following, referred to as a "first substrate") to another substrate (in the following, referred to as a "second substrate"), and the optical film can be kept laminated on the second substrate and used as a retardation plate, for example. More specifically, it is appropriate to laminate an adhesive layer or a pressure sensitive adhesive layer (in the following, referred to as an "adhesive layer or the like") on at least one surface of the second substrate, allow this adhesive layer or the like to adhere to the optical film on the first substrate, and then peel off the first substrate from the optical film.

In this case, the transparency and thickness of the alignment substrate on which the coating solution is expanded are not limited, and the heat resistance and strength thereof preferably are considered instead when selecting the substrate.

On the other hand, there is no particular limitation on, for example, the heat resistance etc. of the second substrate. For example, a transparent substrate and a transparent protective film are preferable. More specifically, transparent glass or plastic film can be used. The plastic film can be a film formed of, for example, polymethyl methacrylate, polystyrene, polycarbonate, polyethersulfone, polyphenylene sulfide, polyarylate, polyethylene terephthalate, polyethylene naphthalate, polyolefin, triacetylcellulose, a norbornene-based resin, an epoxy resin or a polyvinyl alcohol-based resin. Other than the above, the polymer film described in JP 2001-343529 A (WO 01/37007) also can be used, for example. The polymer material used can be a resin composition containing a thermoplastic resin whose side chain has a substituted or unsubstituted imido group and a thermoplastic resin whose side chain has a substituted or unsubstituted phenyl group and nitrile group, for example, a resin composition containing an alternating copolymer of isobutene and N-methylene maleimide and an acrylonitrile-styrene copolymer. The polymer film may be formed by extruding the resin composition. Other than the above, a coating polarizer also can be used as a second polarizer.

Although the second substrate preferably is optically isotropic, it may be optically anisotropic depending on the intended use of the optical film. Such a second substrate having an optical anisotropy may be, for example, a retardation film obtained by stretching the above-mentioned plastic film, a light scattering film having a light scattering property, a diffraction film having a diffraction ability or a polarizing film.

In the case of using the laminate of the cholesteric layer and the transparent substrate of various kinds, the cholesteric layer may be laminated on both surfaces of the transparent substrate. The number of the cholesteric layers may be one or at least two for each surface.

A pressure sensitive adhesive layer or an adhesive layer further may be laminated on the surface of the optical film of the present invention. By laminating the pressure sensitive adhesive layer or the like as above, it becomes easier to laminate the optical film on other optical layers such as a polarizing plate or members such as a liquid crystal cell, for example, thereby preventing the optical film from peeling off.

The material for the adhesive layer is not particularly limited but can be, for example, a polymer adhesive based on an acrylic substance, vinyl alcohol, silicone, polyester, polyurethane, polyether or the like, an isocyanate-based adhesive or a rubber-based adhesive. Also, the material for the pressure sensitive adhesive layer is not particularly limited but can be, for example, a pressure sensitive adhesive based on an acrylic substance, silicone, polyester, rubber or the like. It also may be possible to incorporate fine particles into these materials so as to form a layer showing light diffusion property. Among these materials, materials having excellent moisture absorption and heat resistance are preferable, for example. When the material with such properties is used in a liquid crystal display, for example, it is possible to provide a high-quality durable display apparatus that can prevent foaming or peeling caused by moisture absorption, degradation in the optical properties and warping of a liquid crystal cell caused by difference in thermal expansion coefficients and the like.

The polarizing film and the retardation film of the present invention may be used alone as described above or used as a laminate in combination with other optical members as necessary for various optical applications. More specifically, they are useful as an optically compensating member or the like, in particular, an optically compensating member of a liquid crystal display element. The above-noted other optical members can be, for example, a retardation film having other refractive index structures, a liquid crystal film, a light scattering film, a diffraction film or a polarizing film.

Next, the polarizing plate of the present invention includes the retardation film of the present invention (including the polarizing film of the present invention) and a polarizing film.

An example of the polarizing plate has a structure in which a protective layer is laminated on at least one surface of a polarizing film (a polarizer) via an adhesive layer or a pressure sensitive adhesive layer (in the following, referred to as an "adhesive layer or the like") and the retardation film is laminated on the protective layer via an adhesive layer. The protective layer may be laminated only on one surface of the polarizing film or both surfaces thereof. In the case of laminating the protective layer on both surfaces, the kinds of transparent protective layers to be used may be the same or different. Also, the retardation film may be laminated on one surface of the polarizer or both surfaces thereof either directly or via the protective layer. Further, in addition to the retardation film of the present invention, other retardation films also may be laminated.

The polarizing film is not particularly limited but can be a film prepared by a conventionally known method of, for example, dyeing by allowing a film of various kinds to adsorb a dichroic material such as iodine or a dichroic dye, followed by cross-linking, stretching and drying. Especially, films that transmit linearly polarized light when natural light is made to enter those films are preferable, and films having excellent light transmittance and polarization degree are preferable. Examples of the film of various kinds in which the dichroic material is to be adsorbed include hydrophilic polymer films such as PVA-based films, partially-formalized PVA-based films, partially-saponified films based on ethylene-vinyl acetate copolymer and cellulose-based films. Other than the above, polyene oriented films such as dehydrated PVA and dehydrochlorinated polyvinyl chloride can be used, for example. Among them, the PVA-based film is preferable. In addition, the thickness of the polarizing film generally ranges from 1 to 80 μm, though it is not limited to this.

The protective layer is not particularly limited but can be a conventionally known transparent film. For example, transparent protective films having excellent transparency, mechanical strength, thermal stability, moisture shielding property and isotropism are preferable. Specific examples of materials for such a transparent protective layer can include cellulose-based resins such as triacetylcellulose, and transparent resins based on polyester, polycarbonate, polyamide, polyimide, polyethersulfone, polysulfone, polystyrene, polynorbornene, polyolefin, acrylic substances, acetate and the like. Thermosetting resins or ultraviolet-curing resins based on the acrylic substances, urethane, acrylic urethane, epoxy, silicones and the like can be used as well. Among them, a TAC film having a surface saponified with alkali or the like is preferable in view of the polarization property and durability.

Moreover, the polymer film described in JP 2001-343529 A (WO 01/37007) also can be used. The polymer material used can be a resin composition containing a thermoplastic resin whose side chain has a substituted or unsubstituted imido group and a thermoplastic resin whose side chain has a substituted or unsubstituted phenyl group and nitrile group, for example, a resin composition containing an alternating copolymer of isobutene and N-methylene maleimide and an acrylonitrile-styrene copolymer. Alternatively, the polymer film may be formed by extruding the resin composition.

It is preferable that the protective layer is colorless. More specifically, a retardation value (Rth) of the film in its thickness direction as represented by the equation below preferably ranges from −90 nm to +75 nm, more preferably ranges from −80 nm to +60 nm, and particularly preferably ranges from −70 nm to +45 nm. When the retardation value is within the range of −90 nm to +75 nm, coloration (optical coloration) of the polarizing plate, which is caused by the protective film, can be solved sufficiently. In the equation below, nx, ny, nz and d are similar to those described above.

$$Rth = [\{(nx+ny)/2\} - nz] \cdot d$$

The transparent protective layer further may have an optically compensating function. As such a transparent protective layer having the optically compensating function, it is possible to use, for example, a known layer used for preventing coloration caused by changes in a visible angle based on retardation in a liquid crystal cell or for widening a preferable viewing angle. Specific examples include various films obtained by stretching the above-described transparent resins uniaxially or biaxially, an oriented film of a liquid crystal polymer or the like, and a laminate obtained by providing an oriented layer of a liquid crystal polymer on a transparent base. Among the above, the oriented film of a liquid crystal polymer is preferable because a wide viewing angle with excellent visibility can be achieved. Particularly preferable is an optically compensating retardation plate obtained by supporting an optically compensating layer with the above-mentioned triacetylcellulose film or the like, where the optically compensating layer is made of an incline-oriented layer of a discotic or nematic liquid crystal polymer. This optically compensating retardation plate can be a commercially available product, for example, "WV film" manufactured by Fuji Photo Film Co., Ltd. Alternatively, the optically compensating retardation plate can be prepared by laminating two or more layers of the retardation film and the film support of triacetylcellulose film or the like so as to control the optical characteristics such as retardation.

The thickness of the transparent protective layer is not particularly limited but can be determined suitably according to retardation or protection strength, for example. In general, the thickness is in the range not greater than 5 mm, preferably not greater than 1 mm, more preferably from 1 to 500 μm, and particularly preferably from 5 to 150 μm.

The transparent protective layer can be formed suitably by a conventionally known method such as a method of coating a polarizing film with the above-mentioned various transparent resins or a method of laminating the transparent resin film, the optically compensating retardation plate or the like on the polarizing film, or can be a commercially available product.

The transparent protective layer further may be subjected to, for example, a hard coating treatment, an antireflection treatment, treatments for anti-sticking, diffusion and anti-glaring and the like. The hard coating treatment aims at preventing scratches on the surfaces of the polarizing plate, and is a treatment of, for example, providing a hardened coating film that is formed of a curable resin and has excellent hardness and smoothness onto a surface of the transparent protective layer. The curable resin can be, for example, ultraviolet-curing resins of silicone base, urethane base, acrylic, and epoxy base. The treatment can be carried out by a conventionally known method. The anti-sticking treatment aims at preventing adjacent layers from sticking to each other. The antireflection treatment aims at preventing reflection of external light on the surface of the polarizing plate, and can be carried out by forming a conventionally known antireflection layer or the like.

The anti-glare treatment aims at preventing reflection of external light on the polarizing plate surface from hindering visibility of light transmitted through the polarizing plate. The anti-glare treatment can be carried out, for example, by providing microscopic asperities on a surface of the transparent protective layer by a conventionally known method. Such microscopic asperities can be provided, for example, by roughening the surface by sand-blasting or embossing, or by blending transparent fine particles in the above-described transparent resin when forming the transparent protective layer.

The above-described transparent fine particles may be silica, alumina, titania, zirconia, stannic oxide, indium oxide, cadmium oxide, antimony oxide or the like. Other than the above, inorganic fine particles having an electrical conductivity or organic fine particles comprising, for example, crosslinked or uncrosslinked polymer particles can be used as well. The average particle diameter of the transparent fine particles ranges, for example, from 0.5 to 20 µm, though there is no specific limitation. In general, a blend ratio of the transparent fine particles preferably ranges from 2 to 70 parts by weight, and more preferably ranges from 5 to 50 parts by weight with respect to 100 parts by weight of the above-described transparent resin, though there is no specific limitation.

An anti-glare layer in which the transparent fine particles are blended can be used as the transparent protective layer itself or provided as a coating layer applied onto the transparent protective layer surface. Furthermore, the anti-glare layer also can function as a diffusion layer to diffuse light transmitted through the polarizing plate in order to widen the viewing angle (i.e., visually-compensating function).

The antireflection layer, the anti-sticking layer, the diffusion layer and the anti-glare layer mentioned above can be laminated on the polarizing plate, as a sheet of optical layers comprising these layers, separately from the transparent protective layer.

The method for making the polarizing film and the transparent protective layer adhere to each other is not particularly limited but can be a conventionally known method. In general, a pressure sensitive adhesive, an adhesive or the like similar to the above can be used. The kinds thereof can be determined suitably depending on materials of the polarizing film and the transparent protective layer. The pressure sensitive adhesive, the adhesive or the like described above do not peel off easily even when being exposed to moisture or heat, for example, and have excellent light transmittance and polarization degree. More specifically, polyvinyl alcohol-based adhesives are preferable when the polarizing film is a polyvinyl alcohol-based film, in light of stability of adhering treatment. These adhesive and pressure sensitive adhesive may be applied directly to surfaces of the polarizing film and the transparent protective layer, or a layer of a tape or a sheet formed of the adhesive or pressure sensitive adhesive may be arranged on the surfaces thereof. Further, when these adhesives are prepared as an aqueous solution, for example, other additives or a catalyst such as an acid catalyst may be blended as necessary.

The method for laminating the retardation film and the polarizing film of the present invention is not particularly limited but can be a conventionally known method using the adhesive or the pressure sensitive adhesive as described above. Also, the polarizing film can be provided with the retardation film (the optical film of the present invention). For example, the above-described transparent protective layer is used as a transparent substrate, and on one surface thereof, an alignment substrate is formed. On this alignment substrate, a cholesteric layer is formed. Then, a polarizing film is made to adhere to the other surface of the transparent protective layer, and a transparent protective layer further can be made to adhere to the other surface of the polarizing film.

It is preferable that the polarizing plate according to the present invention further has a pressure sensitive adhesive layer for facilitating lamination onto other members such as a liquid crystal cell or the like as the retardation plate of the present invention described above. Such a pressure sensitive adhesive layer can be arranged on one or both surfaces of the polarizing plate. The material therefor can be similar to those described above. The pressure sensitive adhesive layer can be formed on the surface of the polarizing plate by a method of applying a solution or melt of various materials directly on a predetermined surface of the polarizing plate by an expanding method such as flow-expanding and coating. Alternatively, a pressure sensitive adhesive layer is formed on a separator, which will be described later, in the same manner and transferred to a predetermined surface of the polarizing plate. Such a layer can be formed on any surface of the polarizing plate. For example, it can be formed on an exposed surface of the retardation plate of the polarizing plate.

In the case where a surface of a pressure sensitive adhesive layer provided on the polarizing plate is exposed, it is preferable to cover the pressure sensitive adhesive layer with a separator so as to prevent contamination until the adhesive layer is put to use. The separator can be made of a suitable film such as the above-mentioned transparent protective film by coating a peeling agent if required, and the peeling agent may be selected, for example, from a silicone-based agent, a long-chain alkyl-based agent, a fluorine-based agent, an agent comprising molybdenum sulfide or the like.

The pressure sensitive adhesive layer can be a monolayer or a laminate. The laminate can include monolayers different from each other in the type or in the compositions. When arranged on both surfaces of the polarizing plate, the pressure sensitive adhesive layers can be the same or can be different from each other in types or compositions.

The thickness of the pressure sensitive adhesive layer can be determined suitably depending on the constituents or the like of the polarizing plate. In general, it is from 1 to 500 µm.

It is preferable that the pressure sensitive adhesive layer is made of a pressure sensitive adhesive having excellent optical transparency and appropriate characteristics such as wettability, cohesiveness, and adhesiveness. The pressure sensitive adhesive can be prepared appropriately based on polymers such as an acrylic polymer, a silicone-based polymer, polyester, polyurethane, polyether, and synthetic rubber.

Adhesiveness of the pressure sensitive adhesive layer can be controlled suitably by a conventionally known method. For example, the degree of cross-linkage and the molecular weight will be adjusted on the basis of a composition or molecular weight of the base polymer for forming the pressure sensitive adhesive, a cross-linking method, a content ratio of the crosslinkable functional group, and a ratio of the blended cross-linking agent.

The retardation film and the polarizing plate of the present invention and other layers such as the polarizing film, the transparent protective film, the optical layer and the pressure sensitive adhesive layer or the adhesive layer may be treated with an UV absorber such as salicylate ester compounds, benzophenone compounds, benzotriazole compounds, cyanoacrylate compounds or nickel complex salt-based compounds, thus providing an UV absorbing capability.

The retardation film and the polarizing plate of the present invention can be used in various display apparatus such as a liquid crystal display as described above. The liquid crystal display can be formed by a conventionally know method. That is, the liquid crystal display generally is formed by assembling suitably constituent parts including optical elements such as a liquid crystal cell and a polarizing plate and, as necessary, an illuminating system and incorporating a driving circuit. The manufacturing method of the present invention has no particular limitation as long as the retardation film or the polarizing plate of the present invention is used. The liquid crystal cell can be a cell of any types, for example, a TN type, an STN type or a π type.

More specific examples include a liquid crystal display in which the retardation plate of the present invention and the polarizing plate of the present invention are arranged on one side or both sides of a liquid crystal cell. When the retardation plate and the polarizing plate are arranged on both sides of the liquid crystal cell, the retardation plates or the polarizing plates can be the same or different. Moreover, for forming a liquid crystal display, one layer or two or more layers of suitable parts such as a diffusion plate, an anti-glare layer, an antireflection layer, a protective plate, a prism array sheet, a lens array sheet, an optical diffuser, a backlight, a reflective plate, a semitransparent reflective plate and a brightness enhancement plate can be arranged at suitable positions.

Further, since the polarizing plate of the present invention can be provided with markings by in-line measurement, for example, off-line processes such as a visual inspection immediately after cutting (chip-cutting) the polarizer and packaging become unnecessary, allowing a total in-house manufacturing of attaching the polarizer to a liquid crystal display or an electroluminescence display. This achieves a cost reduction of the display apparatus, for example, and makes it easier to control its manufacturing processes, thus bringing about great industrial significance.

The optical film and the polarizing plate of the present invention can be used not only in the above-described liquid crystal display but also in self-light-emitting displays, for example, an electroluminescence (EL) display, a plasma display (PD) and a field emission display (FED).

Now, the retardation film and the polarizing plate according to the present invention can be used for an organic or inorganic electroluminescence apparatus as well as the liquid crystal display.

In general, an organic electroluminescence (organic EL) apparatus has a luminant (organic EL ruminant) that is prepared by laminating a transparent electrode, an organic luminant layer and a metal electrode in a certain order on a transparent substrate. Here, the organic luminant layer is a laminate of various organic thin films. Known examples thereof include a laminate of a hole injection layer made of a triphenylamine derivative or the like and a ruminant layer made of a phosphorous organic solid such as anthracene; a laminate of the luminant layer and an electron injection layer made of a perylene derivative or the like; or a laminate of the hole injection layer, the luminant layer and the electron injection layer.

In general, the organic EL apparatus emits light on the following principle: a voltage is applied to the transparent electrode and the metal electrode so as to inject holes and electrons into the organic luminant layer, energy generated by the re-bonding of these holes and electrons excites the phosphor, and the excited phosphor emits light when it returns to the basis state. The mechanism of the re-bonding during the process is similar to that of an ordinary diode. This implies that current and the light emitting intensity exhibit a considerable nonlinearity accompanied with a rectification with respect to the applied voltage.

It is preferred for the organic EL apparatus that at least one of the electrodes is transparent so as to obtain luminescence at the organic luminant layer. In general, a transparent electrode of a transparent conductive material such as indium tin oxide (ITO) is used for the anode. Use of substances having small work function for the cathode is effective for facilitating the electron injection and thereby raising luminous efficiency, and in general, metal electrodes such as Mg—Ag and Al—Li can be used.

In an organic EL apparatus configured as described above, the organic luminant layer usually is made of a film that is extremely thin such as about 10 nm. Therefore, the organic ruminant layer can transmit substantially as much light as the transparent electrode does. As a result, when the layer does not illuminate, a light beam entering from the surface of the transparent substrate and passing through the transparent electrode and the organic luminant layer before being reflected at the metal layer comes out again to the surface of the transparent substrate. Thereby, the display surface of the organic EL apparatus looks like a mirror when viewed from the outside.

A transparent electrode can be provided on the surface of the organic luminant layer that emits light by application of voltage. At the same time, in an organic EL apparatus including an organic EL luminant having a metal electrode on the back surface of the organic luminant layer, for example, a polarizing plate can be provided on the surface of the transparent electrode and a retardation plate can be provided between the transparent electrode and the polarizing plate. As these polarizing plate and retardation plate, the polarizing plate and the retardation film according to the present invention can be applied.

The retardation plate and the polarizing plate function to polarize light which enters from outside and is reflected by the metal electrode, and thus the polarization has an effect that the mirror of the metal electrode cannot be viewed from exterior. Particularly, the mirror of the metal electrode can be blocked completely by forming the retardation plate with a quarter wavelength plate and adjusting an angle formed by the polarization directions of the retardation plate and the polarizing plate to be $\pi/4$.

That is, the polarizing plate transmits only the linearly polarized light component among the external light entering the organic EL apparatus. In general, the linearly polarized light is changed into elliptically polarized light by the retardation plate. When the retardation plate is a quarter wavelength plate and when the angle of the polarization directions of the polarizing plate and the retardation plate is $\pi/4$, the light is changed into circularly polarized light.

Generally, this circularly polarized light passes through the transparent substrate, the transparent electrode, and the organic thin film. After being reflected by the metal electrode, the light passes again through the organic thin film, the transparent electrode and the transparent substrate, and turns into linearly polarized light at the retardation plate. Moreover, since the linearly polarized light crosses the polarization direction of the polarizing plate at a right angle, it cannot pass through the polarizing plate. As a result, the mirror of the metal electrode can be blocked completely.

EXAMPLES

The following is a further description of the present invention, with reference to Examples and Comparative examples. It should be noted that the present invention is not limited to these Examples alone.

Example 1

First, 90 parts by weight of a nematic liquid crystal monomer represented by the chemical formula (10) below, 10 parts by weight of a polymerizable chiral dopant having a helical twisting power of $5.5\times10^{-4}$ $nm^{-1}\cdot(wt\%)^{-1}$ represented by the formula (38) below, 5 parts by weight of a UV polymerization initiator (trade name: IRGACURE 907; manufactured by Ciba Specialty Chemicals, used also in the following examples) and 300 parts by weight of methyl ethyl ketone were mixed. Then, this mixture was applied onto an alignment substrate (a polyester film with a thickness of 75 μm). Thereafter, this mixture was subjected to a heat treatment at 70° C. for 3 minutes, thereby aligning the monomer. Subsequently, the monomer was polymerized by an ultraviolet irradiation so as to fix the orientation. Then, the alignment substrate was removed, thus obtaining a completely transparent and smooth retardation film having a thickness of about 2 μm. This retardation film was a birefringent layer of $nx \approx ny > nz$ and had a selective reflection wavelength range of 200 to 220 nm.

Example 3

In a manner similar to that in Example 1, 91 parts by weight of the nematic liquid crystal monomer represented by the chemical formula (10) above, 9 parts by weight of the polymerizable chiral dopant having a helical twisting power of $5.5\times10^{-4}$ $nm^{-1}\cdot(wt\%)^{-1}$ represented by the formula (38) above, 5 parts by weight of the UV polymerization initiator and 300 parts by weight of methyl ethyl ketone were mixed. Then, this mixture was applied onto an alignment substrate (a polyester film with a thickness of 75 μm). Thereafter, this mixture was subjected to a heat treatment at 80° C. for 3 minutes, thereby aligning the monomer. Subsequently, the monomer was polymerized by an ultraviolet irradiation so as to fix the orientation. Then, the alignment substrate was removed, thus obtaining a completely transparent and smooth retardation film having a thickness of about 2 μm. This retardation film was a birefringent layer of $nx \approx ny > nz$ and had a selective reflection wavelength range of 240 to 260 nm.

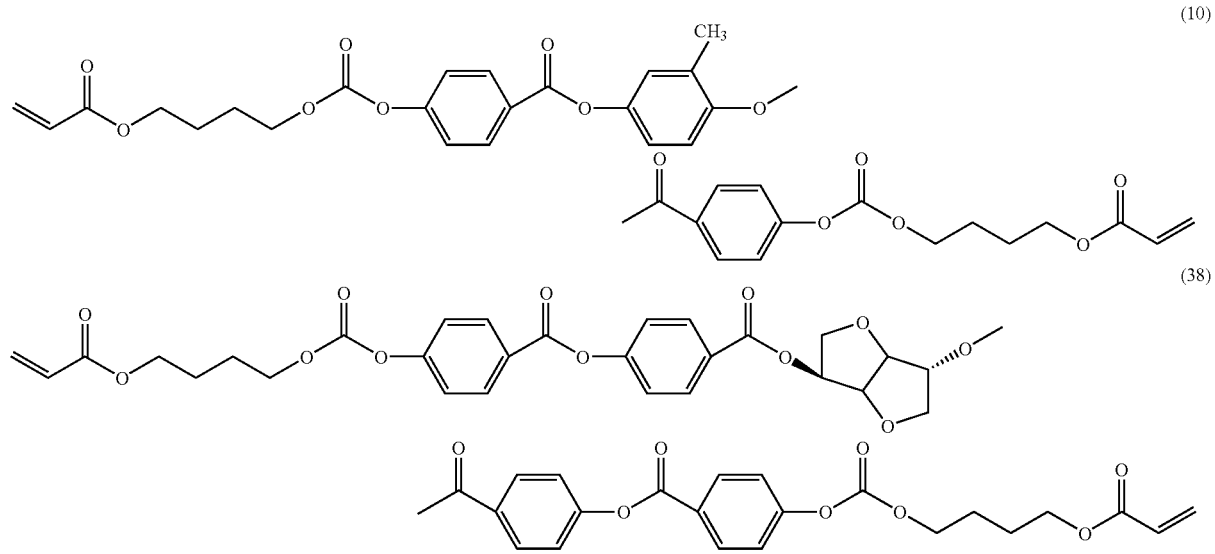

(10)

(38)

Example 2

In a manner similar to that in Example 1, 92 parts by weight of the nematic liquid crystal monomer represented by the chemical formula (10) above, 8 parts by weight of the polymerizable chiral dopant having a helical twisting power of $5.5\times10^{-4}$ $nm^{-1}\cdot(wt\%)^{-1}$ represented by the chemical formula (38) above, 5 parts by weight of the UV polymerization initiator and 300 parts by weight of methyl ethyl ketone were mixed. Then, this mixture was applied onto an alignment substrate (a polyester film with a thickness of 75 μm). Thereafter, this mixture was subjected to a heat treatment at 80° C. for 3 minutes, thereby aligning the monomer. Subsequently, the monomer was polymerized by an ultraviolet irradiation so as to fix the orientation. Then, the alignment substrate was removed, thus obtaining a completely transparent and smooth retardation film having a thickness of about 2 μm. This retardation film was a birefringent layer of $nx \approx ny > nz$ and had a selective reflection wavelength range of 290 to 310 nm.

Example 4

In a manner similar to that in Example 1, 87 parts by weight of a nematic liquid crystal monomer represented by the chemical formula (11) below, 13 parts by weight of a polymerizable chiral dopant having a helical twisting power of $6.0\times10^{-4}$ $nm^{-1}\cdot(wt\%)^{-1}$ represented by the formula (39) below, 5 parts by weight of the UV polymerization initiator and 300 parts by weight of methyl ethyl ketone were mixed. Then, this mixture was applied onto an alignment substrate (a polyester film with a thickness of 75 μm). Thereafter, this mixture was subjected to a heat treatment at 70° C. for 3 minutes, thereby aligning the monomer. Subsequently, the monomer was polymerized by an ultraviolet irradiation so as to fix the orientation. Then, the alignment substrate was removed, thus obtaining a completely transparent and smooth retardation film having a thickness of about 2 μm. This retardation film was a birefringent layer of $nx \approx ny > nz$ and had a selective reflection wavelength range of 190 to 210 nm.

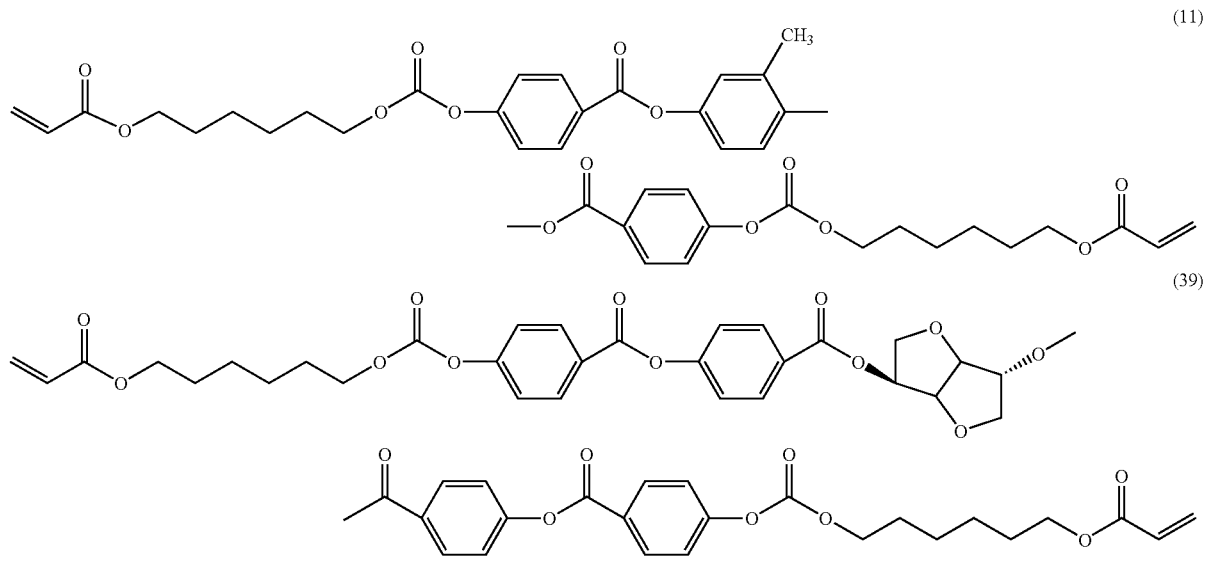

Example 5

In a manner similar to that in Example 1, 83 parts by weight of the nematic liquid crystal monomer represented by the chemical formula (11) above, 17 parts by weight of the polymerizable chiral dopant having a helical twisting power of $6.0 \times 10^{-4}$ nm$^{-1} \cdot$(wt %)$^{-1}$ represented by the formula (39) above, 5 parts by weight of the UV polymerization initiator and 300 parts by weight of methyl ethyl ketone were mixed. Then, this mixture was applied onto an alignment substrate (a polyester film with a thickness of 75 μm). Thereafter, this mixture was subjected to a heat treatment at 60° C. for 5 minutes, thereby aligning the monomer. Subsequently, the monomer was polymerized by an ultraviolet irradiation so as to fix the orientation. Then, the alignment substrate was removed, thus obtaining a completely transparent and smooth retardation film having a thickness of about 2 μm. This retardation film was a birefringent layer of nx≈ny>nz and had a selective reflection wavelength range of 140 to 160 nm.

Comparative Example 1

First, 80 parts by weight of the nematic liquid crystal monomer represented by the chemical formula (11) above, 20 parts by weight of a polymerizable chiral dopant having a helical twisting power of $5.8 \times 10^{-5}$ nm$^{-1} \cdot$(wt %)$^{-1}$ represented by the formula (44) below, 5 parts by weight of the UV polymerization initiator and 300 parts by weight of methyl ethyl ketone were mixed. Then, this mixture was applied onto an alignment substrate (a polyester film with a thickness of 75 μm). Thereafter, this mixture was subjected to a heat treatment at 70° C. for 3 minutes, thereby aligning the monomer. Subsequently, the monomer was polymerized by an ultraviolet irradiation so as to fix the orientation. Then, the alignment substrate was removed, thus obtaining a completely transparent and smooth retardation film having a thickness of about 2 μm. This retardation film was a birefringent layer of nx≈ny>nz and had a selective reflection wavelength range of 330 to 350 nm.

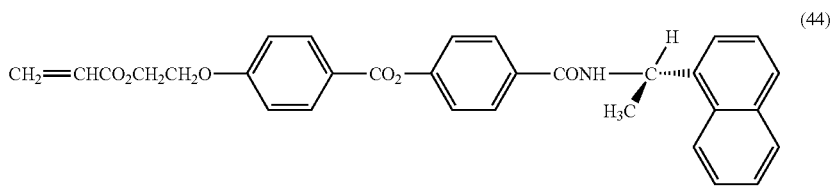

Comparative Example 2

First, 75 parts by weight of the nematic liquid crystal monomer represented by the chemical formula (11) above, 25 parts by weight of the polymerizable chiral dopant having a helical twisting power of $6.0 \times 10^{-4}$ nm$^{-1} \cdot$(wt %)$^{-1}$ represented by the formula (39) above, 5 parts by weight of the UV polymerization initiator and 300 parts by weight of methyl ethyl ketone were mixed. Then, this mixture was applied onto an alignment substrate (a polyester film with a thickness of 75 μm). Thereafter, this mixture was subjected to a heat treatment at 60° C. for 5 minutes, thereby aligning the monomer. Subsequently, the monomer was polymerized by an ultraviolet irradiation so as to fix the orientation. Then, the alignment substrate was removed, thus obtaining a completely transparent and smooth retardation film having a thickness of about 2 μm. This retardation film was a birefringent layer of nx≈ny>nz and had a selective reflection wavelength range of 70 to 90 nm.

The transmittance and hue (single b) of the retardation films produced in Examples 1 to 5 and Comparative examples 1 and 2 above were measured using an integrating-sphere spectral transmittance meter (trade name DOT-3C; manufactured by Murakami Color Research Laboratory). Furthermore, these retardation films were each inserted between two polarizing plates with a polarization degree of 99.95% (manufactured by Nitto Denko Corporation; trade name: HEG1425DU) that were arranged in a crossed Nicols state, and the transmittance in the normal direction (crossed transmittance) and hue (crossed b) of each retardation film were measured. The crossed transmittance and hue (crossed b) were calculated as described earlier. That is, the transmittance and hue of the crossed Nicol polarizing plates alone without placing any retardation film therebetween also were measured in a similar manner, and the measurement values for the polarizing plates alone were subtracted from the values for the polarizing plates and the retardation film.

Also, the retardation of each of the retardation plates was measured using a retardation meter applying a parallel Nicol rotation method as a principle (manufactured by Oji Scientific Instruments, trade name: KOBRA21-ADH). From these results, nx, ny and nz described above were calculated, thus determining Δnd.

Figure 1:
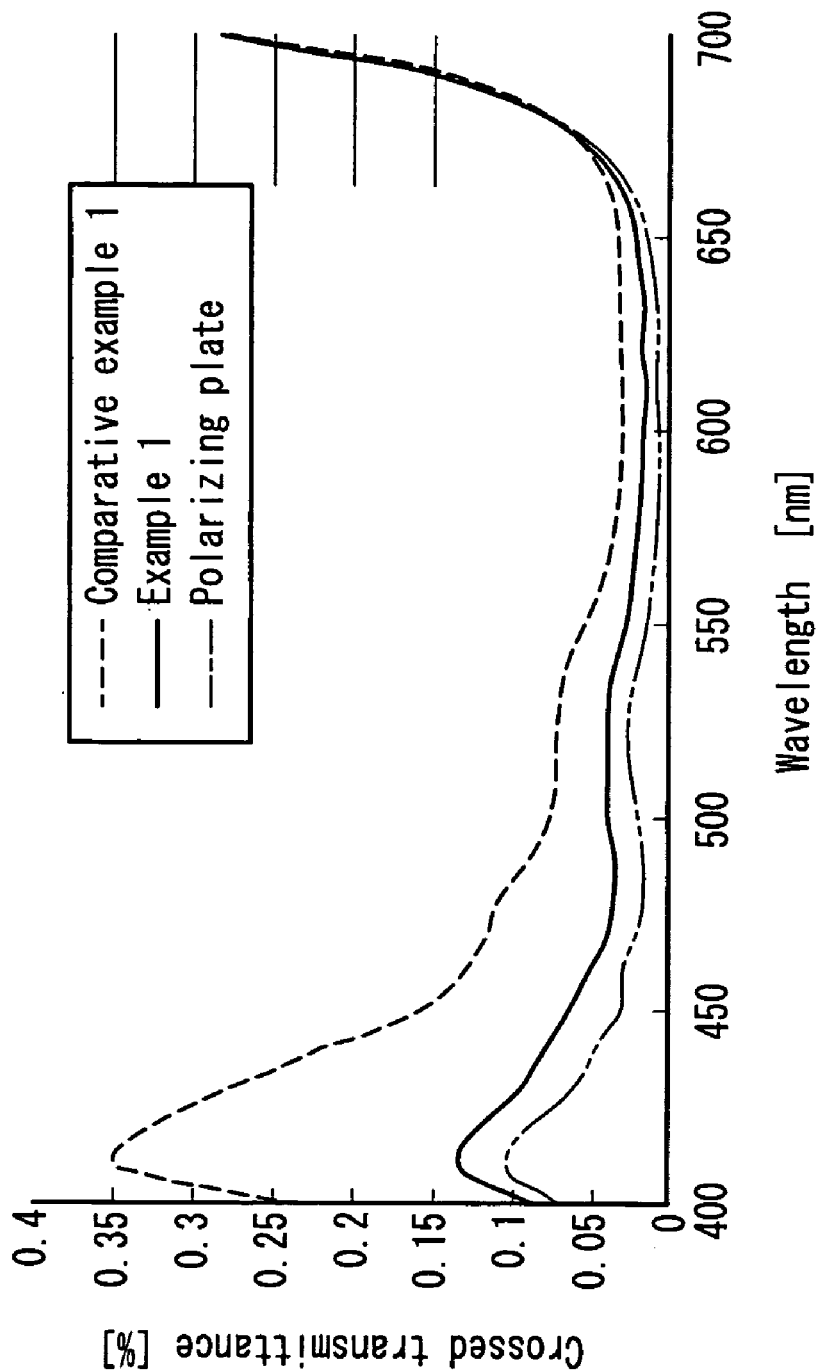
FIG. 1 is a graph showing transmittance variation at each wavelength in an example of the present invention.

Table 1 and Table 2 below show these results. In addition, FIG. 1 shows a relationship between the selective reflection wavelength and the transmittance of each of the retardation films.

TABLE 1

|  | Selective reflection wavelength (nm) | Transmittance (%) | Hue (single b) | In-plane retardation (Δnd) (nm) |
|---|---|---|---|---|
| Example 1 | 200–220 | 91.9 | 0.962 | 1.0 |
| Example 2 | 290–310 | 91.9 | 1.006 | 1.6 |
| Example 3 | 240–260 | 91.9 | 0.993 | 1.3 |
| Example 4 | 190–210 | 91.9 | 0.956 | 0.8 |
| Example 5 | 140–160 | 91.9 | 0.925 | 0.6 |
| Comparative example 1 | 330–350 | 91.7 | 1.299 | 4.0 |
| Comparative example 2 | 70–90 | 91.9 | Poor orientation | Poor orientation |

TABLE 2

|  | Selective reflection wavelength (nm) | Crossed transmittance at 430 nm (%) | Hue (crossed b) |
|---|---|---|---|
| Example 1 | 200–220 | 0.020 | 0.354 |
| Example 2 | 290–310 | 0.077 | −0.050 |
| Example 3 | 240–260 | 0.027 | 0.150 |
| Example 4 | 190–210 | 0.041 | 0.454 |
| Example 5 | 140–160 | 0.008 | 0.765 |
| Comparative example 1 | 330–350 | 0.235 | 2.489 |
| Comparative example 2 | 70–90 | Poor orientation | Poor orientation |
| Polarizing plate | — | 0.041 | −1.228 |

From Table 1, the retardation films of the present invention had a single hue b value of approximately 1.0 or smaller, whereas the retardation film in Comparative example 1 had a single hue b value of about 1.3, showing that the former had extremely less coloration than the latter. Also, the in-plane retardation (Δnd) of Comparative example 1 was 4 nm, whereas the in-plane retardations of the present invention were suppressed to half this value or smaller (1.6 nm or smaller). From these results, it was found that the retardation films of the Examples were optically excellent birefringent layers that had little variation in the in-plane retardation and no influence of coloration. In addition, Table 2 showed that the crossed transmittance of the retardation film of Comparative example 1 was 0.235%, whereas the crossed transmittances of the retardation films of Examples were 0.1% or smaller, which were at most half the value of Comparative example 1. This indicated that the retardation films of the Examples had excellent polarization characteristics. Moreover, since the retardation films of the Examples had extremely smaller absolute values of the crossed hue b value than that of Comparative example, it was found that little light leaked in the visible light region. Incidentally, since the orientation itself was poor in Comparative example 2, it was not possible to measure those values.

Moreover, the retardation film produced in Example 1 was made to adhere to both surfaces of a vertically oriented mode liquid crystal cell. Further, on the surfaces of both of the retardation films, polarizing plates (trade name: SEG1224DU; manufactured by Nitto Denko Corporation) were arranged in a crossed Nicols state, thus producing a liquid crystal display. Then, its display characteristics were visually examined. As a result, it was found that the contrast and display uniformity were excellent over a wide visual angle including front and oblique directions, thus achieving a favorable display quality.

Example 6

(1) Preparation of Coating Solution

First, 90 parts by weight of the polymerizable nematic liquid crystal monomer represented by the formula (10) above, 10 parts by weight of the polymerizable chiral dopant having a helical twisting power of $5.5 \times 10^{-4}$ nm$^{-1}$·(wt %)$^{-1}$ represented by the formula (38) above and 5 parts by weight of the UV polymerization initiator were dissolved in a solvent, i.e., 300 parts by weight of methyl ethyl ketone, thus preparing a coating solution. The coating solution had a viscosity of 3.2 mPa·s.

(2) Production of Polarizing Plate

A TAC protective layer (with a thickness of 80 μm) was laminated on both surfaces of a polarizer (with a thickness of 30 μm) formed of a PVA-based film containing iodine with an acrylic pressure sensitive adhesive, thus producing a polarizing plate.

On the other hand, the above-described coating solution was applied on one surface of a highly-stretched PET film (with a thickness of 75 μm; trade name: T-60; manufactured by TEIJIN LIMITED) and subjected to a heat treatment at 70° C. for 1 minute, thereby aligning the monomer. Subsequently, the monomer was polymerized by an ultraviolet irradiation so as to fix the orientation. In this manner, a 3 μm thick retardation film (a compensating layer) was formed on the PET film. This retardation film had a selective reflection wavelength range of 200 to 220 nm.

Next, the retardation film on the PET film was made to adhere to one surface of the above-mentioned polarizing plate via an acrylic adhesive layer. Then, the PET film was peeled off from this laminate, thus producing a polarizing plate with a compensating layer.

This polarizing plate with a compensating layer was made to adhere to a viewing side of a vertically oriented mode liquid crystal cell such that the above-mentioned compensating layer came in contact with the liquid crystal cell. On the other hand, on a backlight side of the liquid crystal cell, a polarizing plate prepared similarly except that no retardation film was laminated was made to adhere. In this manner, a liquid crystal display was produced. Then, its display characteristics were visually examined. It was found that the contrast and display uniformity were excellent over a wide visual angle including front and oblique directions, thus achieving a favorable display quality.

INDUSTRIAL APPLICABILITY

As described above, when the optical film of the present invention having a selective reflection wavelength range of 100 nm to 320 nm is used as an optical element, for example, as a retardation film or a polarizing plate in various display apparatus such as a liquid crystal display, there is no problem of coloration or the like. Thus, the display is uniform, making it possible to achieve excellent display characteristics.

The invention claimed is:

1. A method for manufacturing a retardation film comprising a cholesteric layer whose constituent molecules are oriented while having a cholesteric structure, the method comprising:

forming an expanded layer by expanding onto an alignment substrate a coating solution that contains a liquid crystalline monomer, a chiral dopant and at least one of a polymerizing agent and a cross-linking agent and has a ratio of the chiral dopant to the liquid crystalline monomer ranging from 5 wt % to 23 wt %;

subjecting the expanded layer to a heat treatment so that the liquid crystalline monomer is oriented while having a cholesteric structure; and subjecting the expanded layer to at least one of a polymerization treatment and a cross-linking treatment so as to fix the orientation of the liquid crystalline monomer and form the cholesteric layer of a non-liquid crystalline polymer, wherein the liquid crystalline monomer is at least one selected from the group consisting of: a compound represented by the below formula (4); a compound represented by the below formula (5); a compound represented by the below formula (6); a compound represented by the below formula (7); a compound represented by the below formula (8); a compound represented by the below formula (9); a compound represented by the below formula (10); a compound represented by the below formula (11); a compound represented by the below formula (12); a compound represented by the below formula (13); a compound represented by the below formula (14); a compound represented by the below formula (15); a compound represented by the below formula (16); a compound represented by the below formula (17); a compound represented by the below formula (18); and a compound represented by the below formula (19), and the chiral dopant is at least one selected from the group consisting of: a compound represented by the below formula (24); a compound represented by the below formula (25); a compound represented by the below formula (26); a compound represented by the below formula (27); a compound represented by the below formula (28); a compound represented by the below formula (29); a compound represented by the below formula (30); a compound represented by the below formula (31); a compound represented by the below formula (32); a compound represented by the below formula (33); a compound represented by the below formula (34); a compound represented by the below formula (35); a compound represented by the below formula (36); a compound represented by the below formula (37); a compound represented by the below formula (38); a compound represented by the below formula (39); a compound represented by the below formula (40); a compound represented by the below formula (41); a compound represented by the below formula (42); a compound represented by the below formula (43); and a compound represented by the below formula (44):

(4)

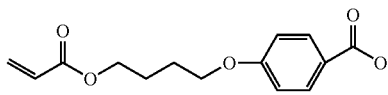

(5)

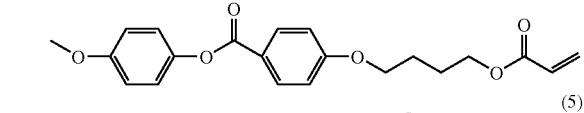

(6)

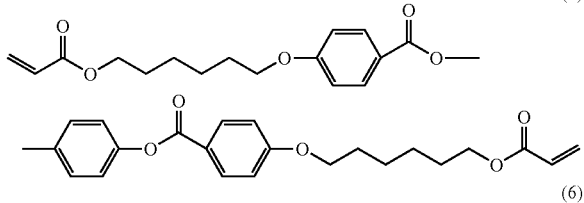

(7)

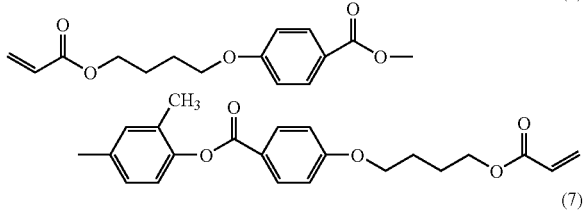

(8)

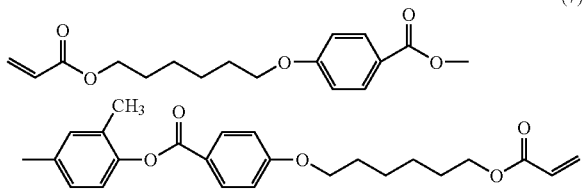

(9)

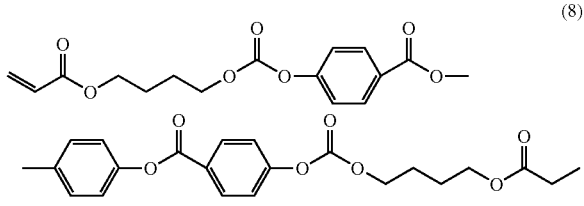

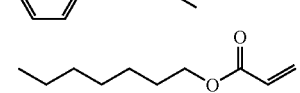

-continued
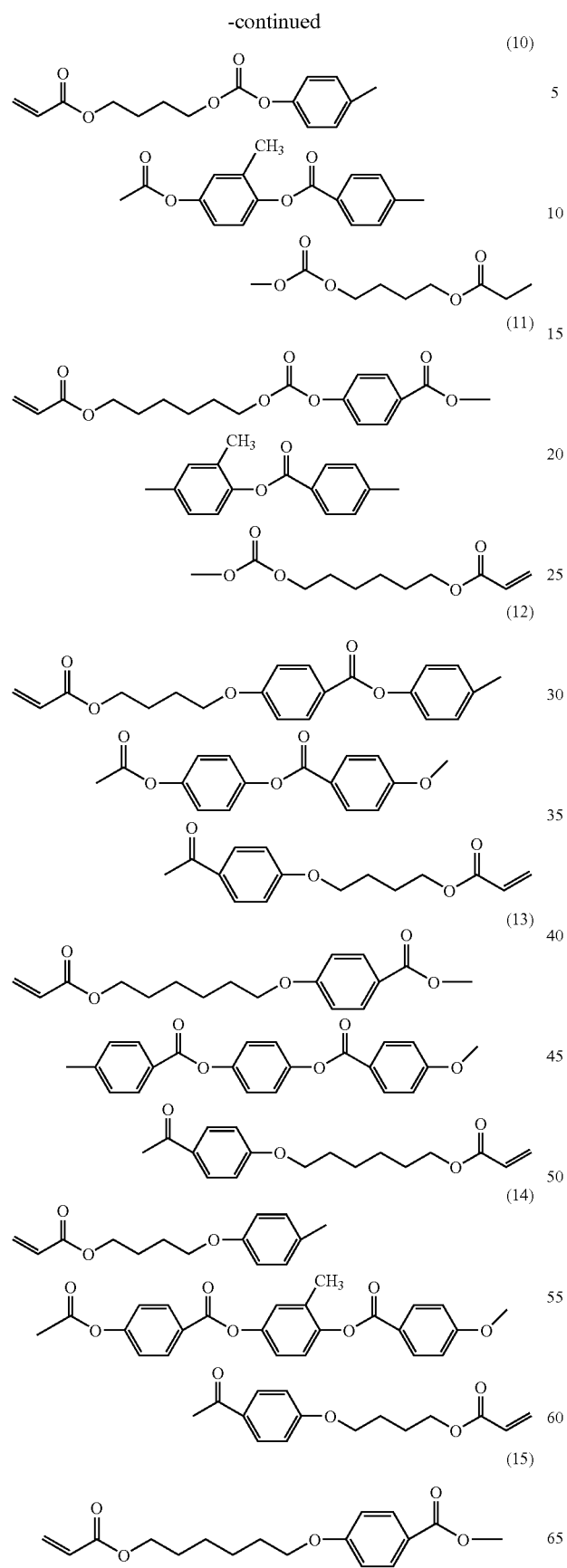
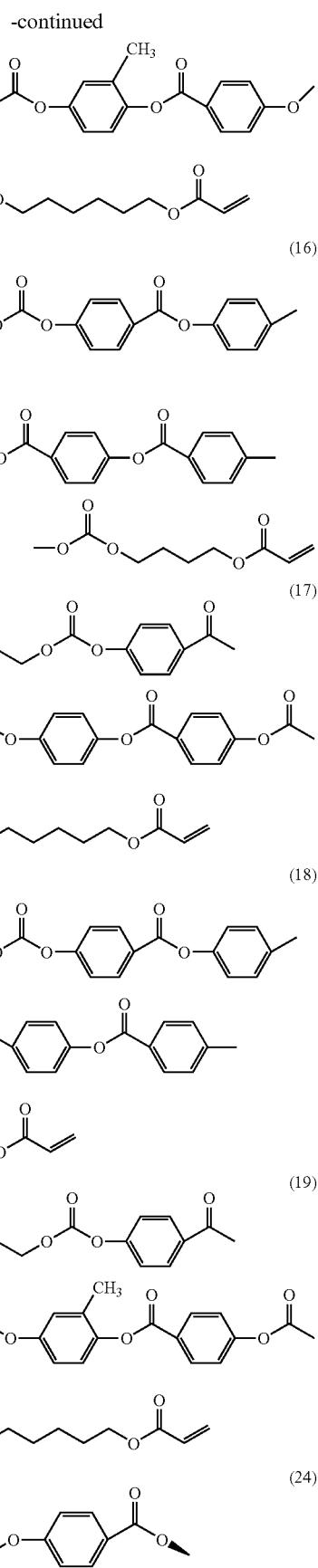

-continued
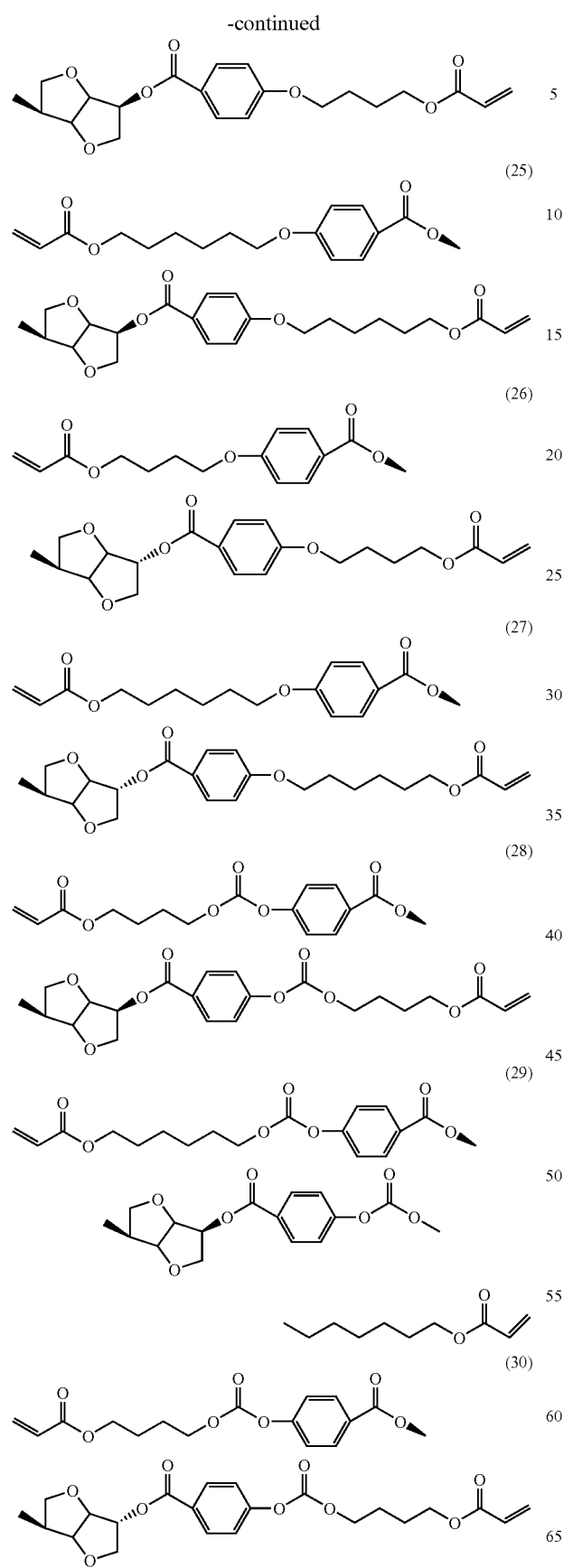
-continued
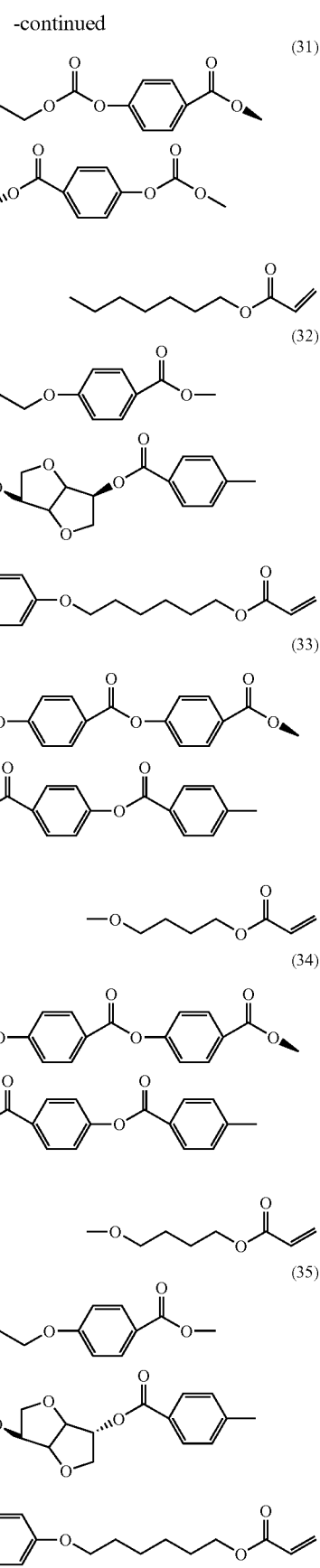

-continued
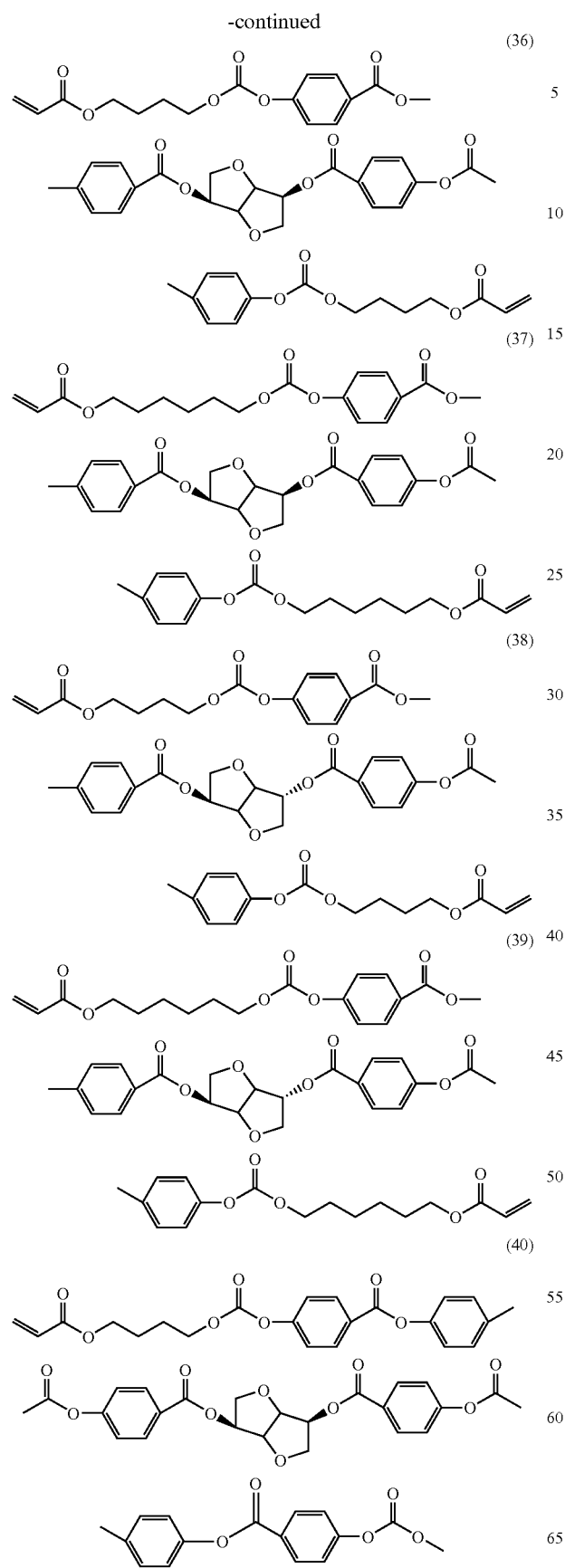
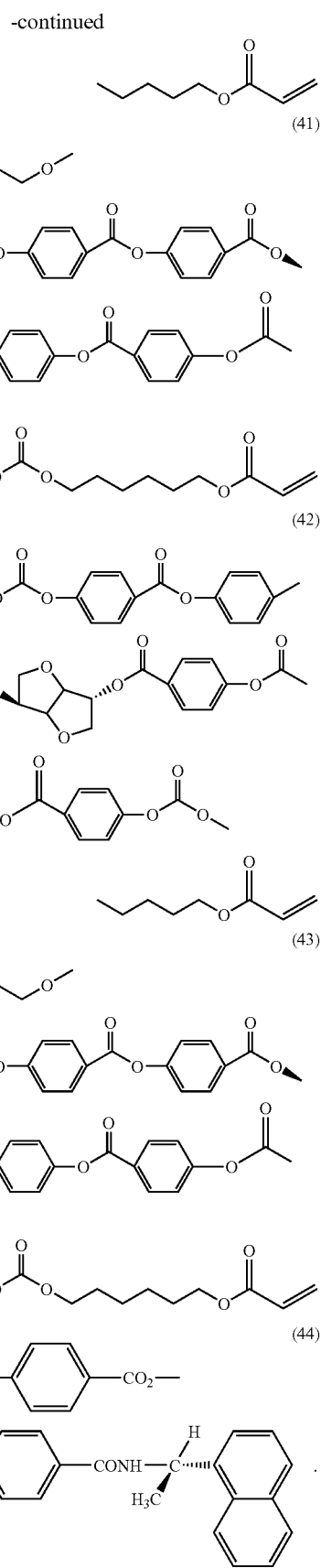

2. The method according to claim 1, wherein the chiral dopant has a helical twisting power of at least $1 \times 10^{-6}$ nm$^{-1}$·(wt %)$^{-1}$.

3. The method according to claim 1, wherein an added ratio of the polymerizing agent or the cross-linking agent to the liquid crystalline monomer ranges from 0.1 wt % to 10 wt %.

4. The method according to claim 1, wherein the polymerization treatment or the cross-linking treatment is at least one selected from the group consisting of an ultraviolet irradiation, a light irradiation and a heat treatment.

5. The method according to claim 1, wherein the alignment substrate has an alignment film on its surface.

6. The method according to claim 1, wherein the alignment substrate is a transparent substrate.

7. The method according to claim 1, further comprising a process of preparing a transparent substrate having at least one surface provided with an adhesive layer, making the cholesteric layer formed on the alignment substrate and the adhesive layer of the transparent substrate adhere to each other, and peeling off the alignment substrate from the expanded layer.

8. The method according to claim 6, wherein a material for the transparent substrate is at least one selected from the group consisting of a cellulose-based polymer, a norbornene-based polymer and a polyvinyl alcohol-based polymer.

9. The method according to claim 7, wherein a material for the transparent substrate is at least one selected from the group consisting of a cellulose-based polymer, a norbornene-based polymer and a polyvinyl alcohol-based polymer.

* * * * *